US007593894B1

(12) United States Patent
Butcher, III

(10) Patent No.: US 7,593,894 B1
(45) Date of Patent: *Sep. 22, 2009

(54) METHOD, SOFTWARE PROGRAM, AND SYSTEM FOR STRUCTURING RISK IN A FINANCIAL TRANSACTION

(75) Inventor: George H. Butcher, III, 310 Oxford Rd., New Rochelle, NY (US) 10804

(73) Assignee: George H. Butcher, III, New Rochelle, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/876,228

(22) Filed: Oct. 22, 2007

Related U.S. Application Data

(63) Continuation of application No. 09/896,629, filed on Jun. 29, 2001, now Pat. No. 7,386,502, which is a continuation-in-part of application No. 09/724,039, filed on Nov. 28, 2000, now Pat. No. 7,266,524.

(51) Int. Cl.
*G06Q 40/00* (2006.01)
(52) U.S. Cl. .................... 705/38; 705/35; 705/36 R; 705/39
(58) Field of Classification Search ............ 705/35, 705/36, 38, 39
See application file for complete search history.

(56) References Cited

U.S. PATENT DOCUMENTS 6,125,355 A * 9/2000 Bekaert et al. ............ 705/36 R
(Continued)

FOREIGN PATENT DOCUMENTS

WO  WO 01/25997  4/2001

WO  WO 0125997 A2 *  4/2001

OTHER PUBLICATIONS

Lang Gibson "Evaluating Credit Enhancement Floors in Equipment ABS." Securitization Conduit. Philadelphia: Sep. 22, 2000; pp. 11-16 (Total 6).*

(Continued)

*Primary Examiner*—Alexander Kalinowski
*Assistant Examiner*—Gregory Johnson
(74) *Attorney, Agent, or Firm*—Winston & Strawn LLP

(57) ABSTRACT

A method of structuring a financial transaction, including allocating to a transaction pool n credits, each of the credits having an obligation to make specified payments and each of the credits being in a non-default state when a respective obligation is met and being in a default state when a respective obligation is not met; associating a senior holder and a subordinate holder with each of the credits using a) a respective senior holder financial instrument through which payments from a respective credit flow to the senior holder and b) a respective subordinate holder financial instrument through which payments from a respective credit flow to the subordinate holder; structuring each senior holder financial instrument and each subordinate holder financial instrument to give priority to payments due each respective senior holder prior to payments due each respective subordinate holder in the event a respective credit enters the default state; using payments from at least one subordinate holder financial instrument associated with a credit in the non-default state to perform the obligation of a credit in the default state to the extent that payments due the senior holder associated with the credit in the default state are not available; and providing each subordinate holder at least a portion of the benefit of the obligation of the credit in the default state to the extent that payments due each subordinate holder were used to perform the obligation of the credit in the default state; wherein n is an integer in the range of 1 to 1000. A corresponding software program and system are also disclosed.

13 Claims, 11 Drawing Sheets

U.S. PATENT DOCUMENTS

| | | | | |
|---|---|---|---|---|
| 6,460,021 | B1* | 10/2002 | Kirksey | 705/35 |
| 7,099,843 | B1* | 8/2006 | Cassidy et al. | 705/38 |
| 7,324,967 | B1* | 1/2008 | Sankaran et al. | 705/35 |
| 7,333,950 | B2* | 2/2008 | Shidler et al. | 705/35 |
| 7,386,502 | B1* | 6/2008 | Butcher, III | 705/38 |
| 2003/0208428 | A1* | 11/2003 | Raynes et al. | 705/36 |

OTHER PUBLICATIONS

Steven Bavaria, "Bear Stearns Launches CBO with Unusual Construction," The Investment Dealers' Digest o IDD. New York: Feb. 10, 1992. vol. 58, Iss. 6: pp. 2.*

Olivier Melennec "CBO, CLO, CDO: A practical guide for investors," Securitization Conduit; 2000; pp. 21-34 (Total 14).*

R Russell Hurst "Collateralized debt obligations (CDOs): Identity crisis," Securitization Conduit; 2000; pp. 17-37 (Total 21).*

Kenneth E Kohler "Collateralized loan obligations: A powerful new portfolio management tool for banks," Securitization Conduit; Summer 1998; pp. 6-20 (Total 15).*

Steve Quickel The ABS market catches a second wind, Institutional Investor; Dec. 1993; p. 125.*

Steven Bavaria, "Bear Steams Launches CBO with Unusual Construction," The Investment Dealers' Digest: IDD. New York: Feb. 10, 1992. vol. 58, Iss. 6:p. 14, 3 pages.

Lang Gibson "Evaluating Credit Enhancement Floors in Equipment ABS." Securitization Conduit. Philadelphia: Sep. 22, 2003. vol. 3, Iss. 3/4; p. 11, 6 pgs.

Examiner's Search Strategy and Results (From U.S. Appl. No. 09/724,039, filed Nov. 28, 2000), Search Results dated Jun. 23, 2004.

Examiner's Search Strategy and Results (From U.S. Appl. No. 09/724,039, filed Nov. 28, 2000), Search Results Report dated Jun. 24, 2004.

Examiner's Search Strategy and Results (From U.S. Appl. No. 09/724,039, filed Nov. 28, 2000), Search Results dated Jun. 25, 2004.

The Handbook of Fixed Income Securities, by Frank J. Fabuzzl, CFA et al., Published by Business One Irwin, Homewood, ILL, 1991 (pp. 353-413 plus cover sheet).

Morton N. Lane, "LDDS As Self-Containing Reissurance Strutures", Trade Notes, Lane Financial LLC, Dec. 10, 2004.

Darrell Duffie et al., "Risk and Evaluation of Collateralized Debt Obligations", Graduate School of Business, Stanford University, First Draft, Aug. 20, 1999.

Examiner's Search Strategy and Results (From U.S. Appl. No. 09/724,039, filed Nov. 28, 2000), Search Results dated Mar. 16, 2006.

Examiner's Search Strategy and Results (From U.S. Appl. No. 09/724,039, filed Nov. 28, 2000), Search Results dated Mar. 17, 2006.

"The Classic M and A Handbook—The Art of M and A—A Merger Acquisition Buyout Guide" Third Ed., McGraw-Hill, 1998 (33 pages).

Examiner's Search Strategy and Results (from U.S. Appl. No. 09/896,629, filed Jun. 29, 2001), Search Results dated Jan. 11, 2008.

* cited by examiner

METHOD, SOFTWARE PROGRAM, AND SYSTEM FOR STRUCTURING RISK IN A FINANCIAL TRANSACTION

RELATED APPLICATIONS

This application is a continuation of U.S. application Ser. No. 09/896,629, filed Jun. 29, 2001 now U.S. Pat. No. 7,386,502, which is a continuation-in-part of U.S. application Ser. No. 09/724,039, filed Nov. 28, 2000 now U.S. Pat. No. 7,266,524. Each of the aforementioned applications is incorporated herein by reference in its entirely.

FIELD OF INVENTION

The present invention relates to a method, software program, and system for structuring risk in a financial transaction. More particularly, the present invention relates to a method, software program, and system for structuring risk among different bonds.

BACKGROUND OF THE INVENTION

Collateralized Bond Obligation ("CBO") creates strong credits (such as loans, bonds, or other obligations) by tranching a large pool of individual credits. The pool can be a large pool of unrated credits such as credit card receivables or a relatively small (e.g., 20 borrowers) pool of rated and/or unrated credits in the case of a municipal State Revolving Fund ("SRF"). The high quality of the more senior CBO tranche(s) is achieved at the expense of the quality of the more junior tranche(s). As the pools get larger, the percentage of underlying credits that can be expected to default decreases even though the absolute number increases. Thus, as the pool becomes larger, the smaller the percentage of total pool that is required to be subordinate, but the more likely it is that a subordinate tranche will in fact sustain losses. The most subordinate tranche is viewed as similar to equity (in the case of an SRF, it is funded with program equity) and bears a large credit and yield penalty.

In general, because the subordinate tranche(s) bear the risk of a default of an underlying credit and adding more credits increases the likelihood that the subordinate tranche(s) will sustain losses (even though losses may decrease on a percentage basis), pools are generally closed unless consent is obtained from the holder(s) of the subordinate tranche(s). As a result, CBOs are generally only used in situations where there is a wide credit and yield spread between the quality of the underlying credits and that of the senior tranche(s) or where there is a compelling business need for someone to hold the equity (e.g., to get the underlying loans off the balance sheet).

Figure 1:
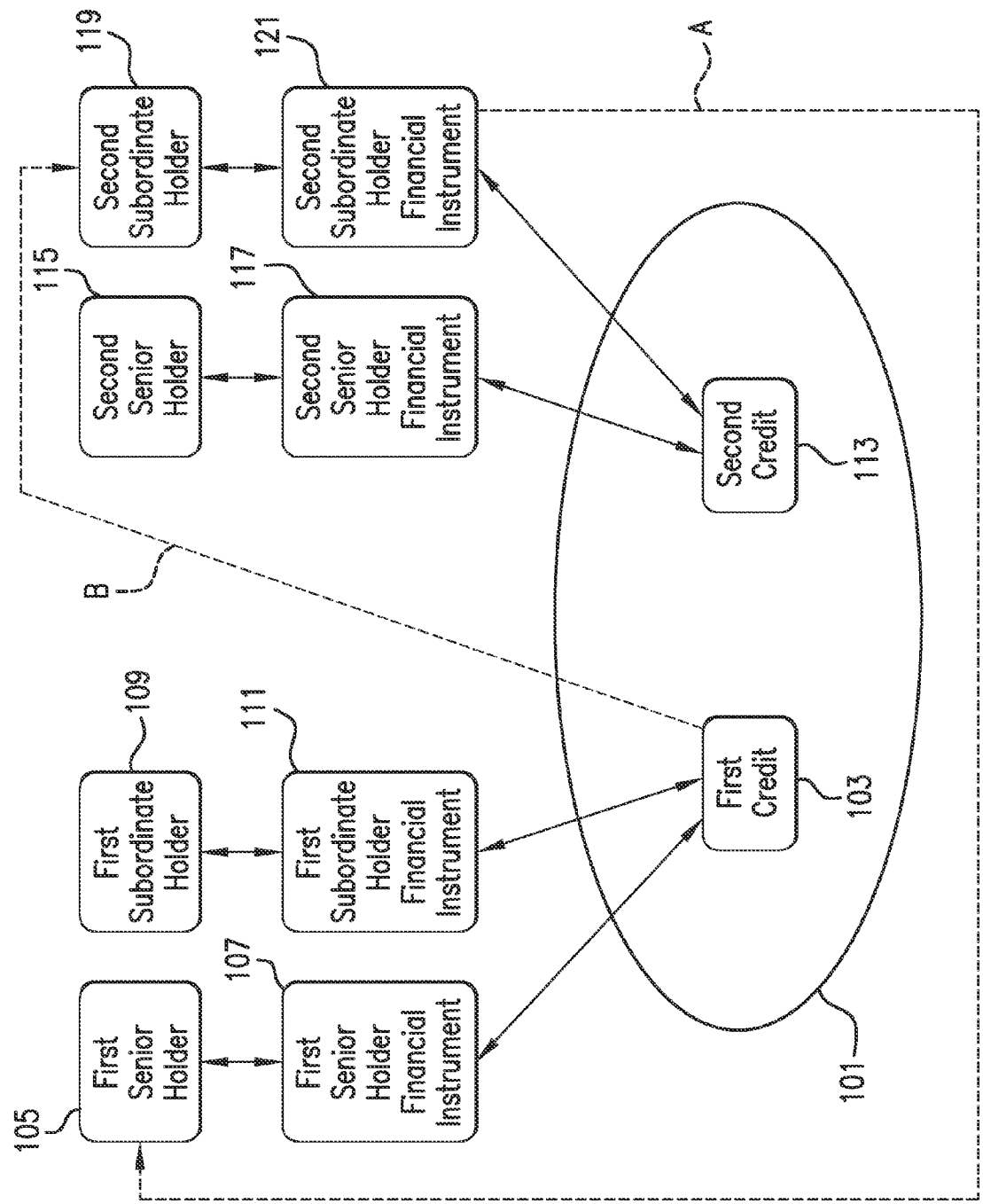
FIG. 1 shows a flowchart of a method according to an embodiment of the present invention.

Among those benefits and improvements that have been disclosed, other objects and advantages of this invention will become apparent from the following description taken in conjunction with the accompanying figures. The figures constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

In one embodiment a method of structuring risk in a financial transaction is provided, including: allocating to a transaction pool a first credit having an obligation to make specified payments and a second credit having an obligation to make specified payments, each of the first credit and second credit being in a non-default state when a respective obligation is met and being in a default state when a respective obligation is not met; associating a first senior holder and a first subordinate holder with the first credit using a) a respective first senior holder financial instrument through which payments from the first credit flow to the first senior holder and b) a respective first subordinate holder financial instrument through which payments from the first credit flow to the first subordinate holder; associating a second senior holder and a second subordinate holder with the second credit using a) a respective second senior holder financial instrument through which payments from the second credit flow to the second senior holder and b) a respective second subordinate holder financial instrument through which payments from the second credit flow to the second subordinate holder; structuring the first senior holder financial instrument and the first subordinate holder financial instrument to give priority to payments due the first senior holder prior to payments due the first subordinate holder in the event the first credit enters the default state; using payments from the second subordinate holder financial instrument to perform the obligation of the first credit for the benefit of the first senior holder to the extent that the first credit enters the default state and payments due the first senior holder are not available; and providing the second subordinate holder the benefit of the obligation of the first credit to the extent that payments due the second subordinate holder were used to perform the obligation of the first credit.

In another embodiment the method may further include: structuring the second senior holder financial instrument and the second subordinate holder financial instrument to give priority to payments due the second senior holder prior to payments due the second subordinate holder in the event the second credit enters the default state; using payments from the first subordinate holder financial instrument to perform the obligation of the second credit for the benefit of the second senior holder to the extent that the second credit enters the default state and payments due the second senior holder are not available; and providing the first subordinate holder the benefit of the obligation of the second credit to the extent that payments due the first subordinate holder were used to perform the obligation of the second credit.

In another embodiment at least one of the first senior holder financial instrument, the second senior holder financial instrument, the first subordinate holder financial instrument, the second subordinate holder financial instrument, the first credit, and the second credit may include a bond.

In another embodiment at least one of the first credit and second credit may include a credit of the type selected from a municipal credit, a tax-exempt hospital credit, an industrial credit, and a high-yield credit.

In another embodiment at least one of a) the step of providing the second subordinate holder the benefit of the obligation of the first credit to the extent that payments due the second subordinate holder were used to perform the obligation of the first credit may be carried out through an assignment and b) the step of providing the first subordinate holder the benefit of the obligation of the second credit to the extent that payments due the first subordinate holder were used to perform the obligation of the second credit may be carried out through an assignment.

In another embodiment at least one of a) the step of providing the second subordinate holder the benefit of the obligation of the first credit to the extent that payments due the second subordinate holder were used to perform the obligation of the first credit may be carried out through a subrogation and b) the step of providing the first subordinate holder the benefit of the obligation of the second credit to the extent that payments due the first subordinate holder were used to perform the obligation of the second credit may be carried out through a subrogation.

In another embodiment at least one of a) the step of providing the second subordinate holder the benefit of the obligation of the first credit to the extent that payments due the second subordinate holder were used to perform the obligation of the first credit may be carried by providing a recovery value associated with first credit and b) the step of providing the first subordinate holder the benefit of the obligation of the second credit to the extent that payments due the first subordinate holder were used to perform the obligation of the second credit may be carried out by providing a recovery value associated with second credit.

In another embodiment at least one of a) the step of providing the second subordinate holder the benefit of the obligation of the first credit to the extent that payments due the second subordinate holder were used to perform the obligation of the first credit may be carried by providing a liquidation value associated with first credit and b) the step of providing the first subordinate holder the benefit of the obligation of the second credit to the extent that payments due the first subordinate holder were used to perform the obligation of the second credit may be carried out by providing a liquidation value associated with second credit.

In another embodiment at least one of a) the first senior financial instrument and the first subordinate financial instrument may be included in a first master financial instrument and b) the second senior financial instrument and the second subordinate financial instrument may be included in a second master financial instrument.

In another embodiment at least one of the first master financial instrument and the second master financial instrument may form a series of bonds having a senior/subordinate structure.

In another embodiment the transaction pool may comprise a trust.

In another embodiment a method of structuring risk in a financial transaction is provided, including: allocating to a transaction pool n credits, each of the credits having an obligation to make specified payments and each of the credits being in a non-default state when a respective obligation is met and being in a default state when a respective obligation is not met; associating a senior holder and a subordinate holder with each of the credits using a) a respective senior holder financial instrument through which payments from a respective credit flow to the senior holder and b) a respective subordinate holder financial instrument through which payments from a respective credit flow to the subordinate holder; structuring each senior holder financial instrument and each subordinate holder financial instrument to give priority to payments due each respective senior holder prior to payments due each respective subordinate holder in the event a respective credit enters the default state; using payments from at least one subordinate holder financial instrument associated with a credit in the non-default state to perform the obligation of a credit in the default state to the extent that payments due the senior holder associated with the credit in the default state are not available; and providing each subordinate holder at least a portion of the benefit of the obligation of the credit in the default state to the extent that payments due each subordinate holder were used to perform the obligation of the credit in the default state; wherein n is an integer in the range of 1 to 1000.

In another embodiment the transaction pool may comprise a trust.

In another embodiment a method of structuring risk in a financial transaction is provided, including: allocating to a transaction pool a first sub-pool containing a first credit having an obligation to make specified payments and a second credit having an obligation to make specified payments, each of the first credit and second credit being in a non-default state when a respective obligation is met and being in a default state when a respective obligation is not met; allocating to the transaction pool a second sub-pool containing a third credit having an obligation to make specified payments and a fourth credit having an obligation to make specified payments, each of the third credit and fourth credit being in a non-default state when a respective obligation is met and being in a default state when a respective obligation is not met; associating a first senior holder and a first subordinate holder with the first credit using a) a respective first senior holder financial instrument through which payments from the first credit flow to the first senior holder and b) a respective first subordinate holder financial instrument through which payments from the first credit flow to the first subordinate holder; associating a second senior holder and a second subordinate holder with the second credit using a) a respective second senior holder financial instrument through which payments from the second credit flow to the first senior holder and b) a respective second subordinate holder financial instrument through which payments from the second credit flow to the second subordinate holder; associating a third senior holder and a third subordinate holder with the third credit using a) a respective third senior holder financial instrument through which payments from the third credit flow to the third senior holder and b) a respective third subordinate holder financial instrument through which payments from the third credit flow to the third subordinate holder; associating a fourth senior holder and a fourth subordinate holder with the fourth credit using a) a respective fourth senior holder financial instrument through which payments from the fourth credit flow to the fourth senior holder and b) a respective fourth subordinate holder financial instrument through which payments from the fourth credit flow to the fourth subordinate holder; structuring the first senior holder financial instrument and the first subordinate holder financial instrument to give priority to payments due the first senior holder prior to payments due the first subordinate holder in the event the first credit enters the default state; structuring the second senior holder financial instrument and the second subordinate holder financial instrument to give priority to payments due the second senior holder prior to payments due the second subordinate holder in the event the second credit enters the default state; structuring the third senior holder financial instrument and the third subordinate holder financial instrument to give priority to payments due the third senior holder prior to payments due the third subordinate holder in the event the third credit enters the default state; structuring the fourth senior holder financial instrument and the fourth subordinate holder financial instrument to give priority to payments due the fourth senior holder prior to payments due the fourth subordinate holder in the event the fourth credit enters the default state; using payments from the second subordinate holder financial instrument to perform the obligation of the first credit for the benefit of the first senior holder to the extent that the first credit enters the default state and payments due the first senior holder are not available; using payments from at least one of the third subordinate holder financial instrument and the fourth subordinate holder financial instrument to perform the obligation of the first credit for the benefit of the first senior holder to the extent that the payments of the second subordinate holder financial instrument used for the benefit of the first senior holder do not cover the obligation of the first credit; providing each of the third subordinate holder and the fourth subordinate holder the benefit of the obligation of the first credit to the first senior holder to the extent that the payments of the third subordinate holder financial instrument and the fourth subordinate holder financial instrument are used for the benefit of the first senior holder; and providing the second subordinate holder the benefit of the obligation of the first credit to the first senior holder to the extent that payments of the second subordinate holder financial instrument were used to perform the obligation of the first credit and to the extent that a benefit exists after any benefit is provided the third subordinate holder and the fourth subordinate holder.

In another embodiment all credits allocated to a particular sub-pool may have a substantially similar risk of entering the default state.

In another embodiment all credits allocated to a particular sub-pool may be selected from one of a traditional municipal credit, a tax-exempt hospital credit, an industrial corporate credit, and a high-yield credit.

In another embodiment the transaction pool may comprise a trust.

In another embodiment a method of structuring risk in a financial transaction is provided, including: structuring a transaction pool with n sub-pools; allocating to each of the sub-pools between j and k credits, each credit having an obligation to make specified payments and each credit being in a non-default state when a respective obligation is met and being in a default state when a respective obligation is not met; associating a senior holder and a subordinate holder with each of the credits using a) a respective senior holder financial instrument through which payments from the credit flow to the senior holder and b) a respective subordinate holder financial instrument through which payments from the credit flow to the subordinate holder; structuring each senior holder financial instrument and each subordinate holder financial instrument to give priority to payments due the respective senior holder prior to payments due the respective subordinate holder in the event the associated credit enters the default state; using payments from each subordinate holder financial instrument associated with credits within the same sub-pool as a defaulting credit to perform the obligation of the defaulting credit for the benefit of the associated senior holder to the extent that payments due the senior holder associated with the defaulting credit are not available; using payments from each subordinate holder financial instrument associated with credits outside the sub-pool containing the defaulting credit to perform the obligation of the defaulting credit for the benefit of the associated senior holder to the extent that the payments of each subordinate holder financial instrument associated with credits within the same the sub-pool as the defaulting credit which were used for the benefit of the senior holder do not cover the obligation of the first credit; providing each subordinate holder associated with credits outside the sub-pool containing the defaulting credit the benefit of the obligation of the defaulting credit to the associated senior holder to the extent that the payments due each subordinate holder associated with credits outside the sub-pool containing the defaulting credit were used to perform the obligation of the defaulting credit; and providing each subordinate holder associated with credits within the same sub-pool as the defaulting credit the benefit of the obligation of the defaulting credit to the associated senior holder to the extent that payments due each subordinate holder associated with credits within the same sub-pool as the defaulting credit were used to perform the obligation of the defaulting credit and to the extent that a benefit exists after any benefit is provided each subordinate holder associated with credits outside the sub-pool containing the defaulting credit; wherein n, j, and k are integers in the range of 1 to 1000.

In another embodiment the transaction pool may comprise a trust.

In another embodiment a method of structuring risk in a financial transaction is provided, including: structuring a transaction pool with n sub-pools, each of the sub-pools containing between j and k mini-pools; allocating to each of the mini-pools between j and k credits and allocating to each of the sub-pools between j and k credits, each credit having an obligation to make specified payments and each credit being in a non-default state when a respective obligation is met and being in a default state when a respective obligation is not met; associating a senior holder and a subordinate holder with each credit using a respective senior holder financial instrument through which payments from the credit flow to the senior holder and a respective subordinate holder financial instrument through which payments from the credit flow to the subordinate holder; structuring each senior holder financial instrument and each subordinate holder financial instrument to give priority to payments due the respective senior holder prior to payments due the respective subordinate holder in the event the associated credit enters the default state; using payments from each subordinate holder financial instrument associated with credits within the same mini-pool as the defaulting credit to perform the obligation of the senior holder financial instrument associated with the defaulting credit for the benefit of the senior holder to the extent that payments due the senior holder associated with the defaulting credit are not available; using payments from each subordinate holder financial instrument associated with credits outside the mini-pool with the defaulting credit but within the same sub-pool as the defaulting credit to perform the obligation of the senior holder financial instrument associated with the defaulting credit for the benefit of the senior holder to the extent that the payments of each subordinate holder financial instrument associated with credits within the same mini-pool as the defaulting credit which were used for the benefit of the senior holder do not cover the obligation of the defaulting credit; using payments from each subordinate holder financial instrument associated with credits outside the sub-pool containing the defaulting credit to perform the obligation of the senior holder financial instrument associated with the defaulting credit for the benefit of the senior holder to the extent that the payments of each subordinate holder financial instrument associated with credits within the same sub-pool as the defaulting credit which were used for the benefit of the senior holder do not cover the obligation of the defaulting credit; providing each subordinate holder associated with credits outside the sub-pool containing the defaulting credit the benefit of the obligation of the defaulting credit to the associated senior holder to the extent that the payments due each subordinate holder associated with credits outside the sub-pool containing the defaulting credit were used to perform the obligation of the defaulting credit; providing each subordinate holder associated with credits within the same sub-pool as the defaulting credit the benefit of the obligation of the defaulting credit to the associated senior holder to the extent that payments due each subordinate holder associated with credits within the same sub-pool as the defaulting credit were used to perform the obligation of the defaulting credit and to the extent that a benefit exists after any benefit is provided each subordinate holder associated with credits outside the sub-pool containing the defaulting credit; and providing each subordinate holder associated with credits within the same mini-pool as the defaulting credit the benefit of the obligation of the defaulting credit to the associated senior holder to the extent that payments due each subordinate holder associated with credits within the same mini-pool as the defaulting credit were used to perform the obligation of the defaulting credit and to the extent that a benefit exists after a) any benefit is provided each subordinate holder associated with credits outside the sub-pool containing the defaulting credit and b) after any benefit is provided each subordinate holder associated with credits outside the mini-pool containing the defaulting credit and within the sub-pool containing the defaulting credit; wherein n, j, and k are integers in the range of 1 to 1000.

In another embodiment all credits allocated to a particular sub-pool may have a substantially similar risk of entering the default state.

In another embodiment all credits allocated to a particular sub-pool may be selected from one of a traditional municipal credit, a tax-exempt hospital credit, an industrial corporate credit, and a high-yield credit.

In another embodiment all credits allocated to a particular mini-pool within a particular sub-pool may be selected from a sub-category associated with the credits allocated to the particular sub-pool.

In another embodiment the transaction pool may comprise a trust.

In another embodiment a method of structuring risk in a financial transaction is provided, comprising: allocating to a trust a first issuer credit having an obligation to make specified payments and a second issuer credit having an obligation to make specified payments, each of the first issuer credit and second issuer credit being in a non-default state when a respective obligation is met and being in a default state when a respective obligation is not met; associating a first senior holder and a first subordinate holder with the first issuer credit using a) a respective first senior holder trust instrument through which payments from the first issuer credit flow to the first senior holder and b) a respective first subordinate holder trust instrument through which payments from the first issuer credit flow to the first subordinate holder; associating a second senior holder and a second subordinate holder with the second issuer credit using a) a respective second senior holder trust instrument through which payments from the second issuer credit flow to the second senior holder and b) a respective second subordinate holder trust instrument through which payments from the second issuer credit flow to the second subordinate holder; structuring the first senior holder trust instrument and the first subordinate holder trust instrument to give priority to payments due the first senior holder prior to payments due the first subordinate holder in the event the first issuer credit enters the default state; using payments from the second subordinate holder trust instrument to perform the obligation of the first issuer credit for the benefit of the first senior holder to the extent that the first issuer credit enters the default state and payments due the first senior holder are not available; and providing the second subordinate holder the benefit of the obligation of the first issuer credit to the extent that payments due the second subordinate holder were used to perform the obligation of the first issuer credit.

In another embodiment at least one of the first senior holder trust instrument, the first subordinate holder trust instrument, the second senior holder trust instrument, and the second subordinate holder trust instrument may be a bond issued by the trust.

In another embodiment a method of structuring risk in a financial transaction is provided, comprising: allocating to a trust an issuer credit having an obligation to make specified payments, wherein the issuer credit is in a non-default state when the obligation is met and is in a default state when the obligation is not met; associating a senior holder and a subordinate holder with the issuer credit using a) a senior holder trust instrument through which payments from the issuer credit flow to the senior holder and b) a subordinate holder trust instrument through which payments from the issuer credit flow to the subordinate holder; and structuring the senior holder trust instrument and the subordinate holder trust instrument to give priority to payments due the senior holder prior to payments due the subordinate holder in the event the issuer credit enters the default state.

In another embodiment at least one of the senior holder trust instrument and the subordinate holder trust instrument may be a bond issued by the trust.

In summary, one embodiment of the present invention provides for what will hereinafter be referred to as the Tranche Subordinated Bond approach (or "TSB" approach), wherein each senior and subordinate holder is primarily exposed to a particular identified ("related") credit and only secondarily exposed to the impact of a default of any other ("unrelated") credit. This is achieved by tranching each individual credit as well as the pool of credits. In other words, each senior TSB holder is primarily exposed to (and perhaps even owns an interest in) a particular credit. The senior TSB holder cannot be affected by any underlying default except a default on its related credit and only if the amount of the default exceeds the amount of the subordinate TSBs related to the same underlying credit. It is believed that this should also have the benefit of avoiding concentration and capacity problems for holders of senior TSBs, analogous to bond insurance for which holder capacity is based on the underlying credit. If a default exceeds the amount of the related subordinate TSBs (i.e., the subordinate TSBs that are primarily exposed to the same underlying credit), then amounts payable to the holders of unrelated subordinate TSBs would be applied to make the holders of the related senior TSBs whole and the unrelated subordinate TSB holders would become owners of or become subrogated to the claim of the related senior TSB holders.

If the amount of the senior TSBs is less than the expected recovery value in the event of a default of the underlying credit, then the unrelated subordinate TSB holders would be exposed to a temporary non-payment ("timing risk") but not to a permanent non-payment ("ultimate payment risk") in the event of a default on the underlying credit since unrelated subordinate holders would be reimbursed from recovery value when it is realized. Another characteristic of the TSB approach is that the amount of senior TSBs created may be limited to increase the likelihood that a payment default could be fully absorbed by the holders of the related subordinate TSB holders. Consequently, there may be an intermediate tranche which is in effect a pass-through of the underlying credit with neither the benefit nor burden of the tranching of the pool. In one example the intermediate tranche would have the identical credit characteristics of the related underlying credit, with the possible exception that all of the recovery value of the loan may be devoted first to amounts due to the related senior TSBs (including such amounts to which unrelated subordinate TSBs have become subrogated).

Thus, when a new credit is added to the pool or the amount of an existing credit is increased, the risk to the unrelated subordinated TSB holders can be minimized, first, because the first loss is borne by holders of the related subordinate TSBs and, second, because the risk to the unrelated subordinate TSB holders is essentially timing risk rather than ultimate payment risk. Credits could be added to the pool either at the behest of an issuer or by a holder of an underlying credit. This approach could be targeted toward credits that in fact are directly held in the public debt markets such as investment grade rated credits or high-yield credits that are directly held by institutional buyers. Both ultimate payment risk and timing risk to unrelated subordinate TSB holders could effectively be eliminated through the use of sub-pools and/or mini-pools as described below.

To further reduce the risk to holders of unrelated subordinate TSBs, it may be desirable to create sub-pools within the larger pool where the nature of the risk to subordinate TSB holders within the sub-pool is similar. For example, traditional municipal credits, tax-exempt hospital credits, industrial corporate credits, and high-yield credits (including municipal) might be separated. Also, credits of a particular rating category might be separated from credits of a different rating category. It is believed that the senior TSBs within the sub-pool should be able to independently achieve high-grade ratings. However, to maximize the credit benefit to all senior TSBs, all senior TSBs could ultimately be secured by all subordinate TSBs. To still insulate subordinate TSB holders from risk associated with a different sub-pool, it may be a requirement that, in order to combine sub-pools, the senior TSBs within each sub-pool must meet a specified rating standard (e.g., triple-A) without the benefit of any cross-subsidization from any other sub-pool. Hence, no subordinate TSB from a different pool would be affected unless a credit that is triple-A on its own (the senior TSBs within the other sub-pool) would default without the benefit of the cross-subsidization. This reduces the risk to each subordinate TSB holder from credits that are qualitatively different, while maintaining the benefit to the senior TSBs of having the largest and most diverse possible pool of subordinate TSBs securing the senior TSBs.

From a credit and disclosure perspective, it is believed that an important factor to a senior TSB holder are the quality of the underlying credit (which the TSB holder is explicitly choosing) and the quality of the credit enhancement provided by the entire pool. Given the diversity of the pool, it is believed that it would be unnecessary to provide disclosure on any particular credit. In any case, it is likely that all of the underlying credits would be registered or otherwise have publicly available disclosure that could be incorporated by reference. The ability to identify each underlying credit and incorporated disclosure by reference could be important to providing adequate disclosure to subordinated TSB holders who are on a secondary or tertiary basis exposed to credits across the pool. It is believed, however, that the relevant disclosure on an unrelated sub-pool should be no more than would be required for the senior tranche of a stand alone pool (since no subordinate TSB holder would be affected by a default on a credit within an unrelated pool unless the senior tranche would otherwise default), which for a large and diverse pool would be a standard disclosure only.

In another embodiment, if, for a particular type of credit, there are sub-pools representing different rating categories, the integrity of the sub-pools could be maximized in the event of a downgrade of the rating of an underlying credit by transferring the credit from the higher rated sub-pool to the lower rated sub-pool. This should not materially affect the holders of the related senior TSBs since they are secured by the whole pool. It is believed that this may slightly disadvantage the holders of the related subordinate TSBs in that they would be exposed to secondary risk related to an underlying default in the lower rated sub-pool. However, it would impose on the subordinate TSB holder who chose the credit the full burden of the credit deterioration rather than sharing it with the holders of unrelated subordinate TSBs within the higher rated sub-pool. The holders in the sub-pool to which the credit is transferred would not be hurt since their exposure would be no different than that related to adding any other qualifying credit to the sub-pool. Similarly, if an underlying credit has its rating increased, that credit could be transferred to the higher rated sub-pool for that credit type. For the same reasons as just stated, there would be no detriment to the holders in the sub-pool to which the credit is transferred and the transfer would give the holder of the transferred subordinate TSB the full benefit of the appreciation of the credit.

Any actual default would be primarily the responsibility of the subordinate TSB holders in the related sub-pool (and their transferees) at the time of the default and secondarily the responsibility of the unrelated subordinate TSB holders within the pool. Alternatively, the program manager could at some earlier point identify a troubled credit as the responsibility of the subordinate TSB holders as of that date (and their transferees). Thus, a problem with a particular credit can be isolated so as not to affect the ability to add other credits to the pool. Otherwise, a troubled credit could disincentivize potential subordinated TSB holders from participating in the related pool since a loss on that credit would be shared by the new subordinated TSB holder.

In a further embodiment, for credits without significant recovery values, such as credits in bankruptcy which may or may not have liquidation values (for which it is impossible to eliminate ultimate payment risk by tranching an individual credit), or simply to eliminate timing risk to unrelated TSBs, or to increase the proportion of the securities that can be converted into senior TSBs, it may be necessary or desirable for the subordinate TSB structure to be based on groups of underlying credits (a "mini-pool") rather than a single underlying credit. The structure of a mini-pool would be similar to that of a sub-pool in that any default within the pool would first be borne by the holders of the subordinate TSBs within the mini-pool before the holders of any unrelated subordinate TSBs would be affected. Each mini-pool might contain credits of a particular sub-category of the type of credits in the corresponding sub-pool (e.g., credits related to a particular industry, such as telecommunications). The senior TSBs related to a mini-pool could still be based on individual credits rather than on the mini-pool of credits. The test for addition of a mini-pool to a sub-pool could be significantly less rigorous than the test for addition of a sub-pool to the pool. It may only be necessary that the ultimate payment risk and/or timing risk to holders of unrelated subordinate TSBs be made comparable to the risk posed by each other underlying credit or pool of mini-credits within the sub-pool.

Using the TSB approach, an institutional holder (e.g., a pension fund) could create high-grade, credit enhanced, more liquid senior TSBs related to either individual securities or a mini-pool of securities that it holds. As the pool gets larger, the credit quality of the senior TSBs would increase (or at least the probability of any non-payment would get less and less). It is further believed that the result for the senior TSBs would be similar to adding bond insurance to municipal bonds: a) an increase in price or b) a decrease in market yield. Alternatively, rather than being reflected in the price of the senior TSBs, the economic benefit of the TSB structure could be reflected in a higher retained yield on the subordinate TSBs.

Referring now to FIG. 1, a flowchart showing a method according to an embodiment of the invention is shown. As seen in this FIG. 1, Pool 101 contains First Credit 103. First Credit 103, which includes an obligation to make specified payments, can be in a non-default state if the obligation is met or a default state if the obligation is not met. First Senior Holder 105 is associated with First Credit 103 using First Senior Holder Financial Instrument 107, through which payments flow from First Credit 103 to First Senior Holder 105. First Subordinate Holder 109 is associated with First Credit 103 using First Subordinate Holder Financial Instrument 111, through which payments flow from First Credit 103 to First Subordinate Holder 109. First Senior Holder Financial Instrument 107 and First Subordinate Holder Financial Instrument 111 may be structured to provide for the priority of payments from First Credit 103 to First Senior Holder 105 prior to payments from First Credit 103 to First Subordinate Holder 109.

Pool 101 also contains Second Credit 113. Second Credit 113, which includes an obligation to make specified payments, can be in a non-default state if the obligation is met or a default state if the obligation is not met. Second Senior Holder 115 is associated with Second Credit 113 using Second Senior Holder Financial Instrument 117, through which payments flow from Second Credit 113 to Second Senior Holder 115. Second Subordinate Holder 119 is associated with Second Credit 113 using Second Subordinate Holder Financial Instrument 121, through which payments flow from Second Credit 113 to Second Subordinate Holder 119. Second Senior Holder Financial Instrument 117 and Second Subordinate Holder Financial Instrument 121 may be structured to provide for the priority of payments from Second Credit 113 to Second Senior Holder 115 prior to payments from Second Credit 113 to Second Subordinate Holder 119.

In the event that First Credit 103 enters the default state any payments available from First Credit 103 are first applied to First Senior Holder 105 (at the expense of First Subordinate Holder 109). To the extent that the payments to First Senior Holder 105 are still not sufficient to cover the obligation of First Credit 103 then payments due Second Subordinate Holder 119 are used to cover the obligation to First Senior Holder 105 (this is shown by the dashed line marked A in FIG. 2). Further, to the extent that any benefit remains in the obligation of First Credit 103 to First Senior Holder 105 then Second Subordinate Holder 119 is provided such remaining benefit (this is shown by the dashed line marked B in FIG. 2).

Of course, if Second Credit 113 enters the default state rather than First Credit 103 an analogous operation is carried out with regard to First Subordinate Holder 109, Second Senior Holder 115, and Second Credit 113.

Figure 2:
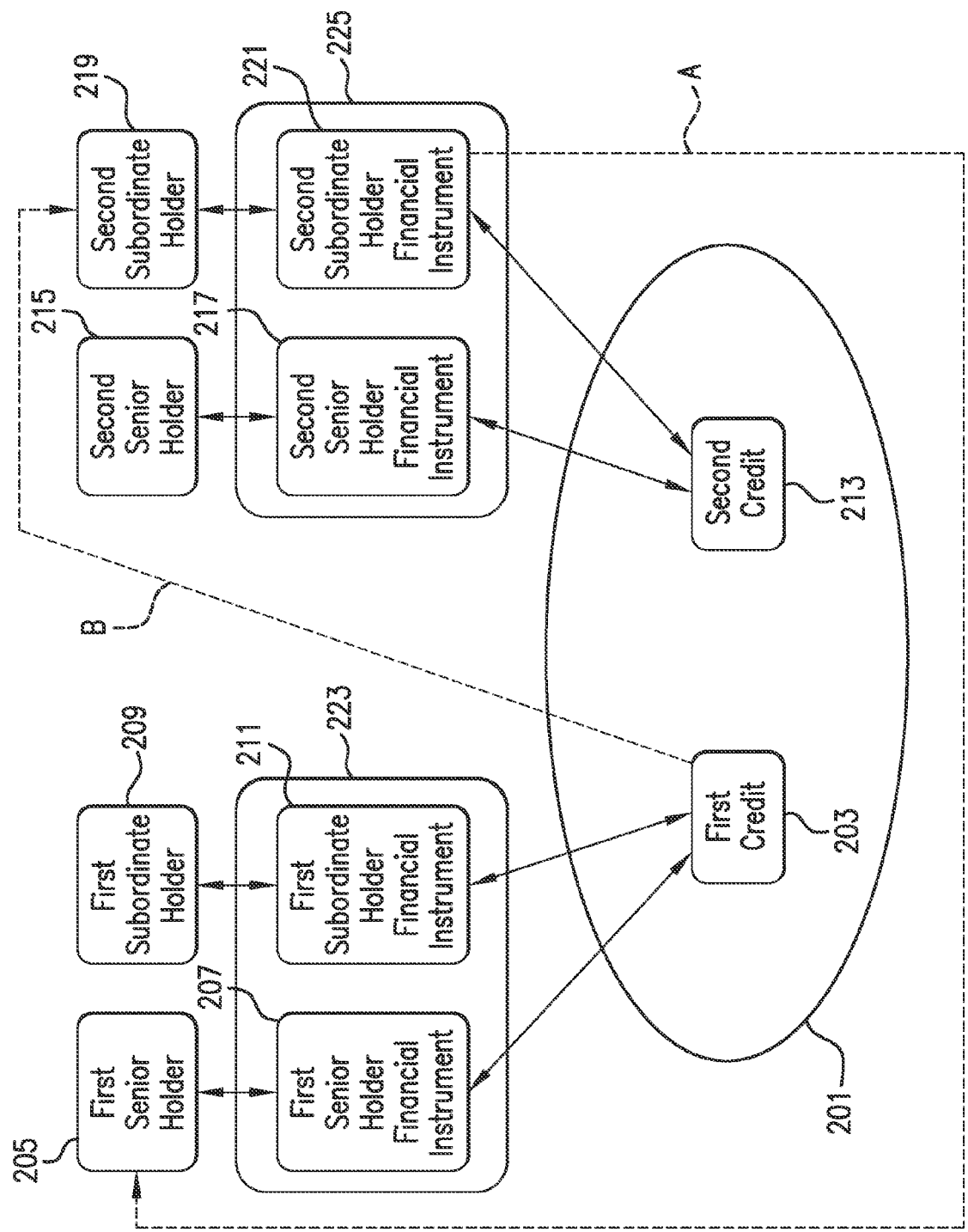
FIG. 2 shows a flowchart of a method according to another embodiment of the present invention.

Referring now to FIG. 2, a flowchart showing a method according to another embodiment of the present invention is shown. This embodiment is similar to the embodiment of FIG. 1 and elements of FIG. 1 corresponding to elements of FIG. 2 will not be described again in detail. The principle difference between the embodiments of FIGS. 1 and 2 is that in the embodiment of FIG. 2 the First Senior Holder Financial Instrument 207 and the First Subordinate Holder Financial Instrument 211 are included within a First Master Financial Instrument 223 and the Second Senior Holder Financial Instrument 217 and the Second Subordinate Holder Financial Instrument 221 are included within a Second Master Financial Instrument 225 The two embodiments otherwise operate in a similar manner.

Figure 3:
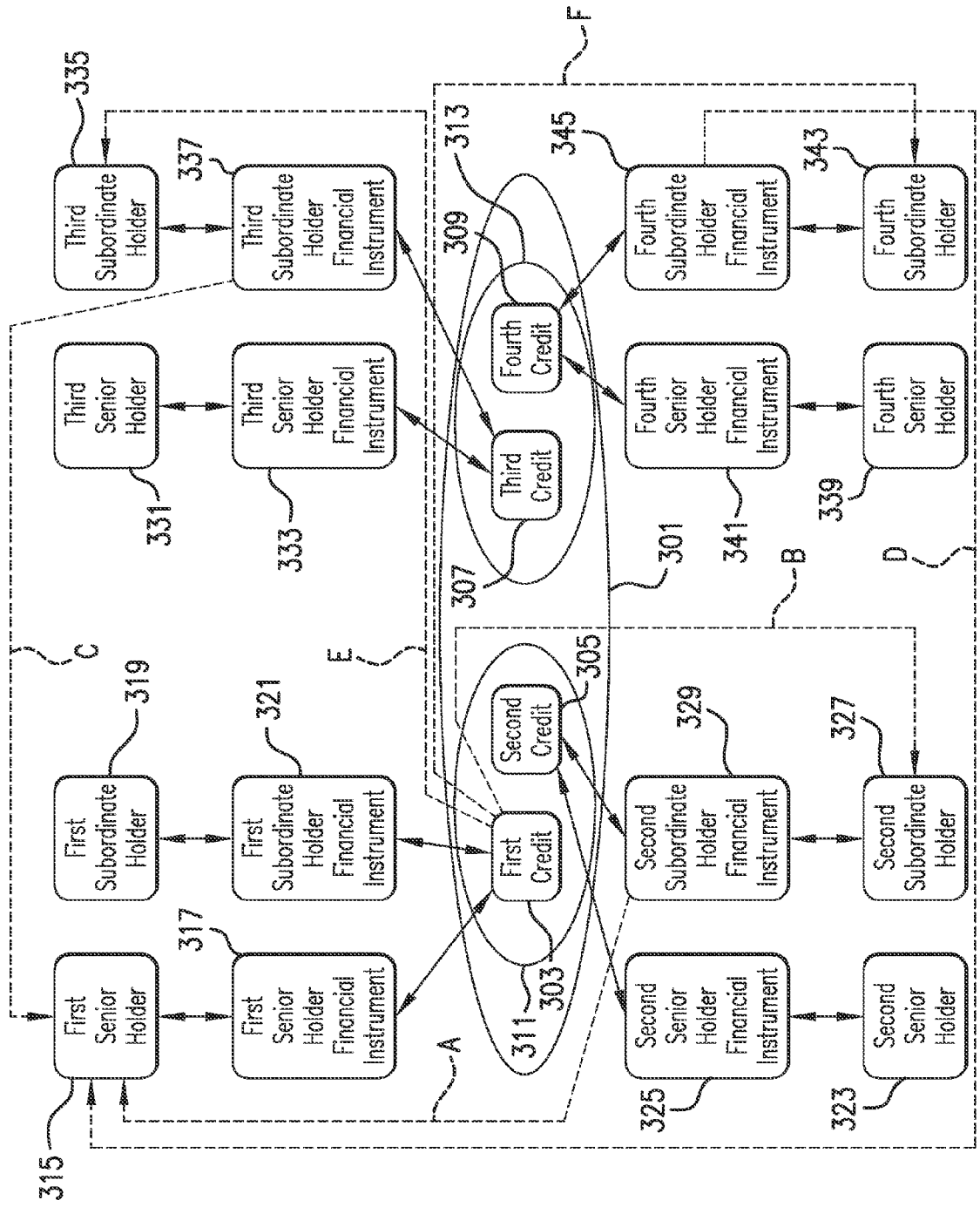
FIG. 3 shows a flowchart of a method according to another embodiment of the present invention.

Referring now to FIG. 3, a flowchart showing a method according to another embodiment of the invention is shown. As seen in this Fig., Pool 301 contains First Credit 303, Second Credit 305, Third Credit 307, and Fourth Credit 309. First Credit 303 and Second Credit 305 are included within First Sub-Pool 311 and Third Credit 307 and Fourth-Credit 309 are included within Second Sub-Pool 313. Each of First Credit 303, Second Credit 305, Third Credit 307, and Fourth Credit 309 includes an obligation to make specified payments and each of First Credit 303, Second Credit 305, Third Credit 307, and Fourth Credit 309 can be in a non-default state if a respective obligation is met or a default state if the obligation is not met.

First Senior Holder 315 is associated with First Credit 303 using First Senior Holder Financial Instrument 317, through which payments flow from First Credit 303 to First Senior Holder 315. First Subordinate Holder 319 is associated with First Credit 303 using First Subordinate Holder Financial Instrument 321, through which payments flow from First Credit 303 to First Subordinate Holder 319. First Senior Holder Financial Instrument 317 and Second Senior Holder Financial Instrument 321 may be structured to provide for the priority of payments from First Credit 303 to First Senior Holder 315 prior to payments from First Credit 303 to First Subordinate Holder 319.

Further, as shown in FIG. 3, each of second through fourth Senior Holders and Subordinate Holders are associated with respective Credits through respective Financial Instruments. The various Financial Instruments may be structured as described above with reference to the priority of payments between corresponding Senior Holders and Subordinate Holders.

In the event that First Credit 303 enters the default state any payments available from First Credit 303 are first applied to First Senior Holder 315 (at the expense of First Subordinate Holder 319). To the extent that the payments to First Senior Holder 315 are still not sufficient to cover the obligation of First Credit 303 then payments due Second Subordinate Holder 327 are used to cover the obligation to First Senior Holder 315 (this is shown by the dashed line marked A in FIG. 3).

Further, to the extent that the payments to First Senior Holder 315 which had been due Second Subordinate Holder 327 are insufficient to fulfill the obligation of First Credit 303 the payments due Third Subordinate Holder 335 and Fourth Subordinate Holder 343 may be used (shown by the dashed lines marked C and D in FIG. 3). Thereafter, to the extent that any benefit remains in the obligation of First Credit 303 to First Senior Holder 315, and to the extent that payments due Third Subordinate Holder 335 and Fourth Subordinate Holder 343 had been directed to First Senior Holder 315, Third Subordinate Holder 335 and Fourth Subordinate Holder 343 are provided such remaining benefit (this is shown by the dashed lines marked E and F in FIG. 3). Finally, to the extent that any benefit remains in the obligation of First Credit 303 to First Senior Holder 315 after Third Subordinate Holder 335 and Fourth Subordinate Holder 343 have been made whole, Second Subordinate Holder 327 is provided such remaining benefit (this is shown by the dashed line marked B in FIG. 3).

Of note is the fact that the operation of Sub-Pool 311 is similar to the operation of Pool 101 of FIG. 1. Also of note is the fact that any remaining benefit may not be applied to Second Subordinate Holder 327 (associated with a Credit in the same Sub-Pool as the defaulting Credit) until Third Subordinate Holder 335 and Fourth Subordinate Holder 343 (associated with a Credit in a different Sub-Pool than the defaulting Credit) have been made whole. In another example, if a Credit other than First Credit 303 enters the default state then an analogous operation is carried out with regard to each Subordinate Holder, each Senior Holder, and each Credit.

Figure 4:
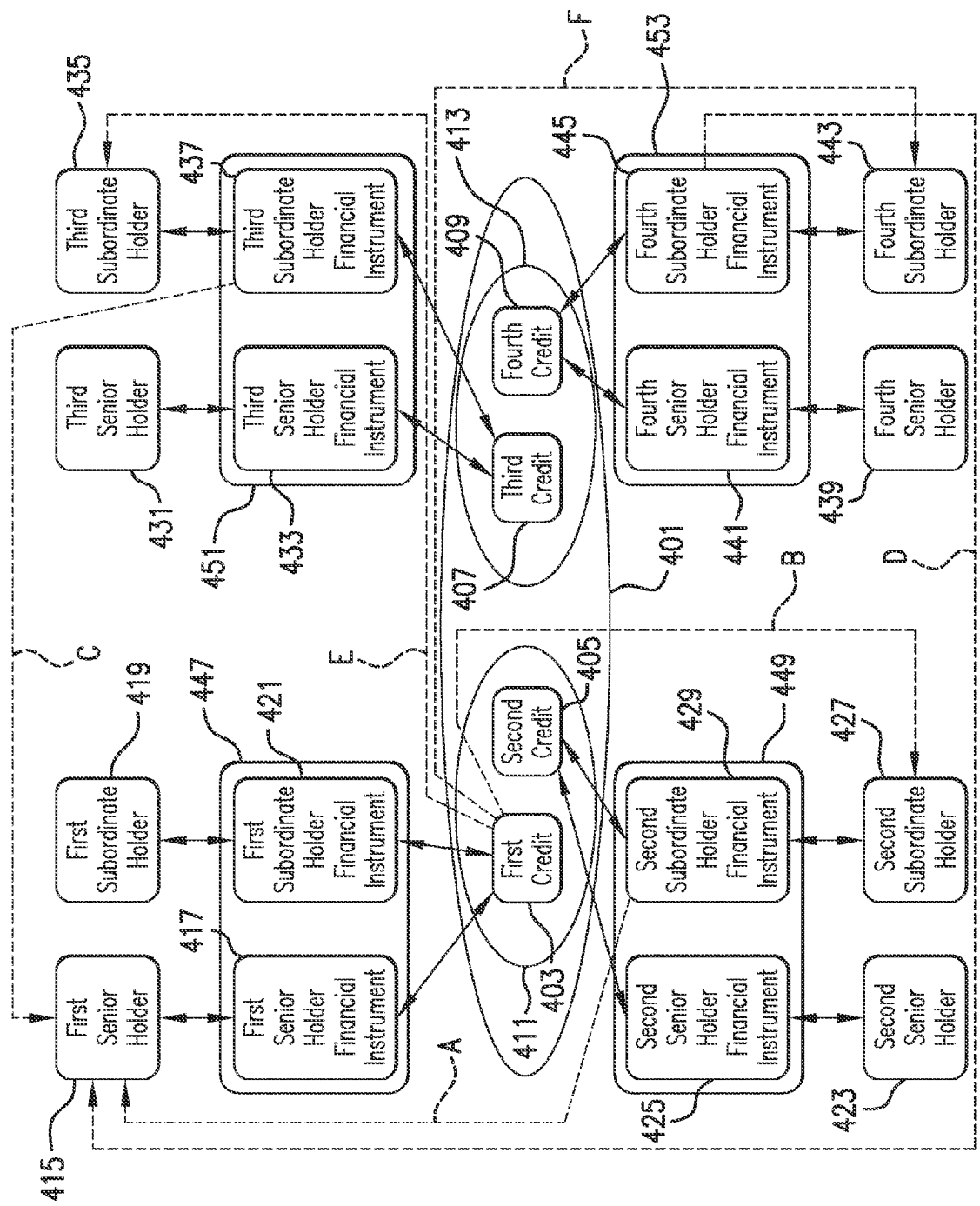
FIG. 4 shows a flowchart of a method according to another embodiment of the present invention.

Referring now to FIG. 4, a flowchart showing a method according to another embodiment of the present invention is shown. This embodiment is similar to the embodiment of FIG. 3 and elements of FIG. 3 corresponding to elements of FIG. 4 will not be described again in detail. The principle difference between the embodiments of FIGS. 3 and 4 is that in the embodiment of FIG. 4 each associated Senior Holder Financial Instrument and Subordinate Holder Financial Instrument is included within a Master Financial Instrument. The two embodiments otherwise operate in a similar manner.

Figure 5:
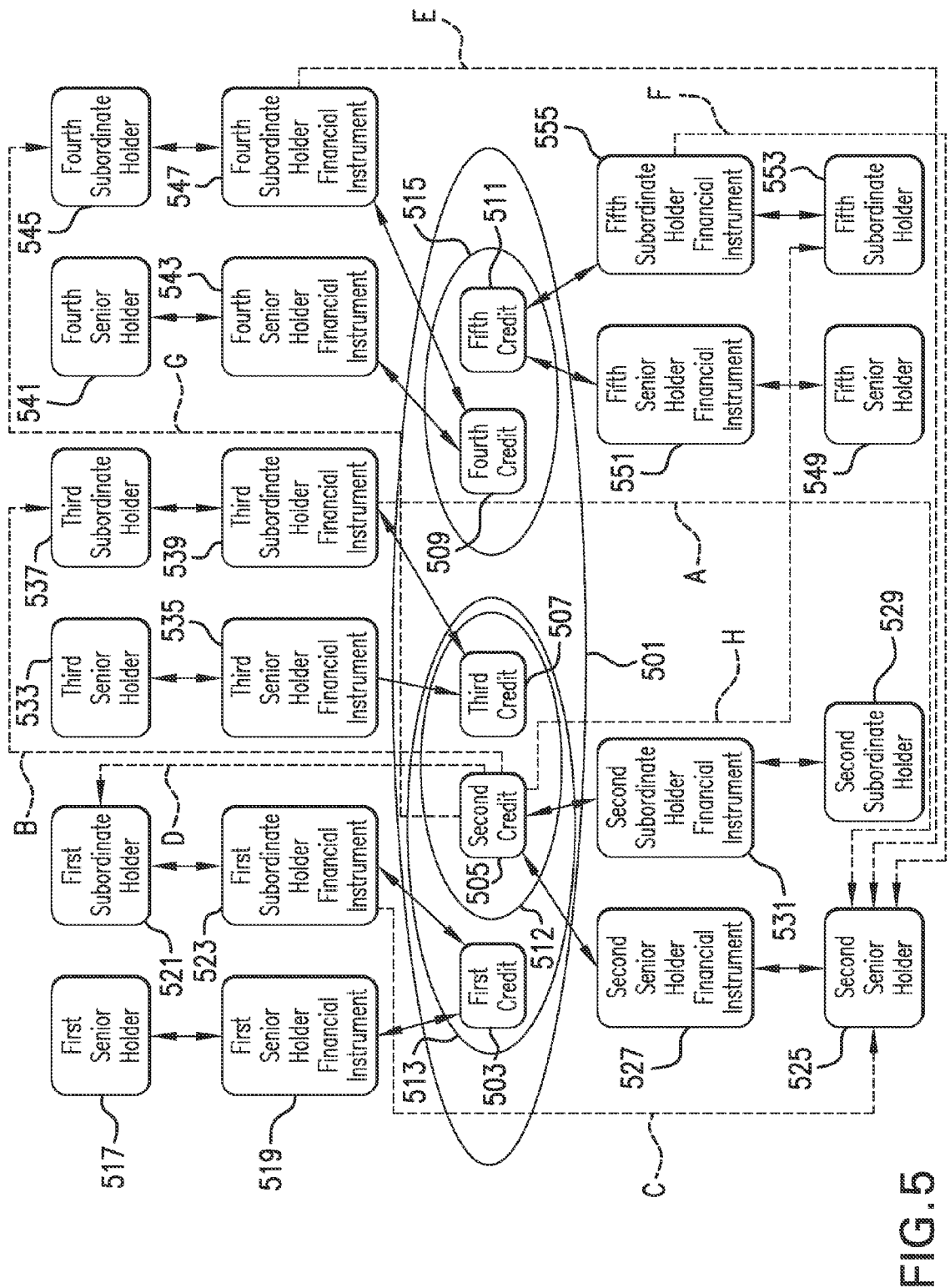
FIG. 5 shows a flowchart of a method according to another embodiment of the present invention.

Referring now to FIG. 5, a flowchart showing a method according to another embodiment of the invention is shown. As seen in this Fig., Pool 501 contains First Credit 503, Second Credit 505, Third Credit 507, Fourth Credit 509 and Fifth Credit 511. Second Credit 505 and Third Credit 507 are included within Mini-Pool 512 which in turn is included within First Sub-Pool 513. First Credit 503 is also included within First Sub-Pool 513. Further, Fourth Credit 509 and Fifth Credit 511 are included within Second Sub-Pool 515. Each of First Credit 503, Second Credit 505, Third Credit 507, Fourth Credit 509 and Fifth Credit 511 includes an obligation to make specified payments and each of First Credit 503, Second Credit 505, Third Credit 507, Fourth Credit 509 and Fifth Credit 511 can be in a non-default state if a respective obligation is met or a default state if the obligation is not met.

First Senior Holder 517 is associated with First Credit 503 using First Senior Holder Financial Instrument 519, through which payments flow from First Credit 503 to First Senior Holder 517. First Subordinate Holder 521 is associated with First Credit 503 using First Subordinate Holder Financial Instrument 523, through which payments flow from First Credit 503 to First Subordinate Holder 521. First Senior Holder Financial Instrument 519 and First Subordinate Holder Financial Instrument 523 may be structured to provide for the priority of payments from First Credit 503 to First Senior Holder 517 prior to payments from First Credit 503 to First Subordinate Holder 521.

Further, as shown in FIG. 5, each of second through fifth Senior Holders and Subordinate Holders are associated with respective Credits through respective Financial Instruments. The various Financial Instruments may be structured as described above with reference to the priority of payments between corresponding Senior Holders and Subordinate Holders.

In the event that Second Credit 505 enters the default state any payments available from Second Credit 505 are first applied to Second Senior Holder 525 (at the expense of Second Subordinate Holder 529). To the extent that the payments to Second Senior Holder 525 are still not sufficient to cover the obligation of Second Credit 505, payments due Third Subordinate Holder 537 are used to cover the obligation to Second Senior Holder 525 (this is shown by the dashed line marked A in FIG. 5). Further, to the extent that the payments to Second Senior Holder 525 which had been due Third Subordinate Holder 537 are insufficient to fulfill the obligation of Second Credit 505, payments due First Subordinate Holder 521 may be used (shown by the dashed line marked C in FIG. 5).

Further still, to the extent that the payments to Second Senior Holder 525 which had been due First Subordinate Holder 521 are insufficient to fulfill the obligation of Second Credit 505, payments due Fourth Subordinate Holder 545 and Fifth Subordinate Holder 553 may be used (shown by the dashed lines marked E and F in FIG. 5).

Thereafter, to the extent that any benefit remains in the obligation of Second Credit 505 to Second Senior Holder 525, and to the extent that payments due Fourth Subordinate Holder 545 and Fifth Subordinate Holder 553 had been directed to Second Senior Holder 525, Fourth Subordinate Holder 545 and Fifth Subordinate Holder 553 are provided such remaining benefit (this is shown by the dashed lines marked G and H in FIG. 5). Next, to the extent that any benefit remains in the obligation of Second Credit 505 to Second Senior Holder 525 after Fourth Subordinate Holder 545 and Fifth Subordinate Holder 553 have been made whole, and to the extent that payments due First Subordinate Holder 521 had been directed to Second Senior Holder 525, First Subordinate Holder 521 is provided such remaining benefit (this is shown by the dashed line marked D in FIG. 5).

Finally, to the extent that any benefit remains in the obligation of Second Credit 505 to Second Senior Holder 525 after First Subordinate Holder 521, Fourth Subordinate Holder 545 and Fifth Subordinate Holder 553 have been made whole, Third Subordinate Holder 537 is provided such remaining benefit (this is shown by the dashed line marked B in FIG. 5).

Of note is the fact that the operation of Mini-Pool 512 is similar to the operation of both Sub-Pool 311 of FIG. 3 and Pool 101 of FIG. 1. Also of note is the fact that: a) any remaining benefit may not be applied to Third Subordinate Holder 537 (which is associated with a Credit in the same Mini-Pool as the defaulting Credit) until First Subordinate Holder 521 (which is associated with a Credit outside the Mini-Pool with the defaulting Credit) has been made whole; and b) any remaining benefit may not be applied to First Subordinate Holder 521 (which is associated with a Credit in the same Sub-Pool as the defaulting Credit) until Fourth Subordinate Holder 545 and Fifth Subordinate Holder 553 (which are associated with Credits outside the Sub-Pool with the defaulting Credit) have been made whole.

Of course, if a Credit other than Second Credit 505 enters the default state then an analogous operation is carried out with regard to each Subordinate Holder, each Senior Holder, and each Credit.

Figure 6:
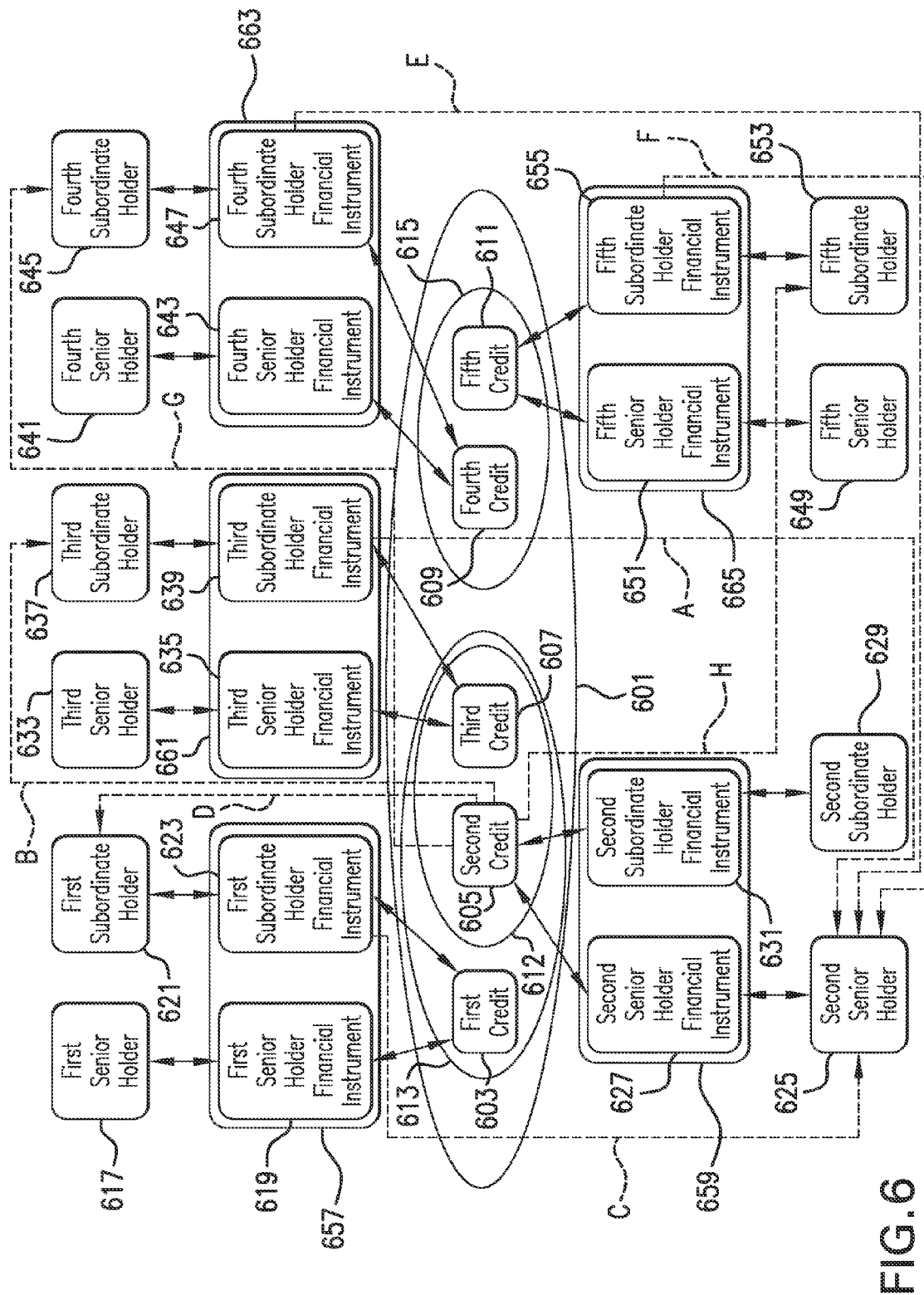
FIG. 6 shows a flowchart of a method according to another embodiment of the present invention.

Referring now to FIG. 6, a flowchart showing a method according to another embodiment of the present invention is shown. This embodiment is similar to the embodiment of FIG. 5 and elements of FIG. 5 corresponding to elements of FIG. 6 will not be described again in detail. The principle difference between the embodiments of FIGS. 5 and 6 is that in the embodiment of FIG. 6 each associated Senior Holder Financial Instrument and Subordinate Holder Financial Instrument is included within a Master Financial Instrument. The two embodiments otherwise operate in a similar manner.

Figure 7:
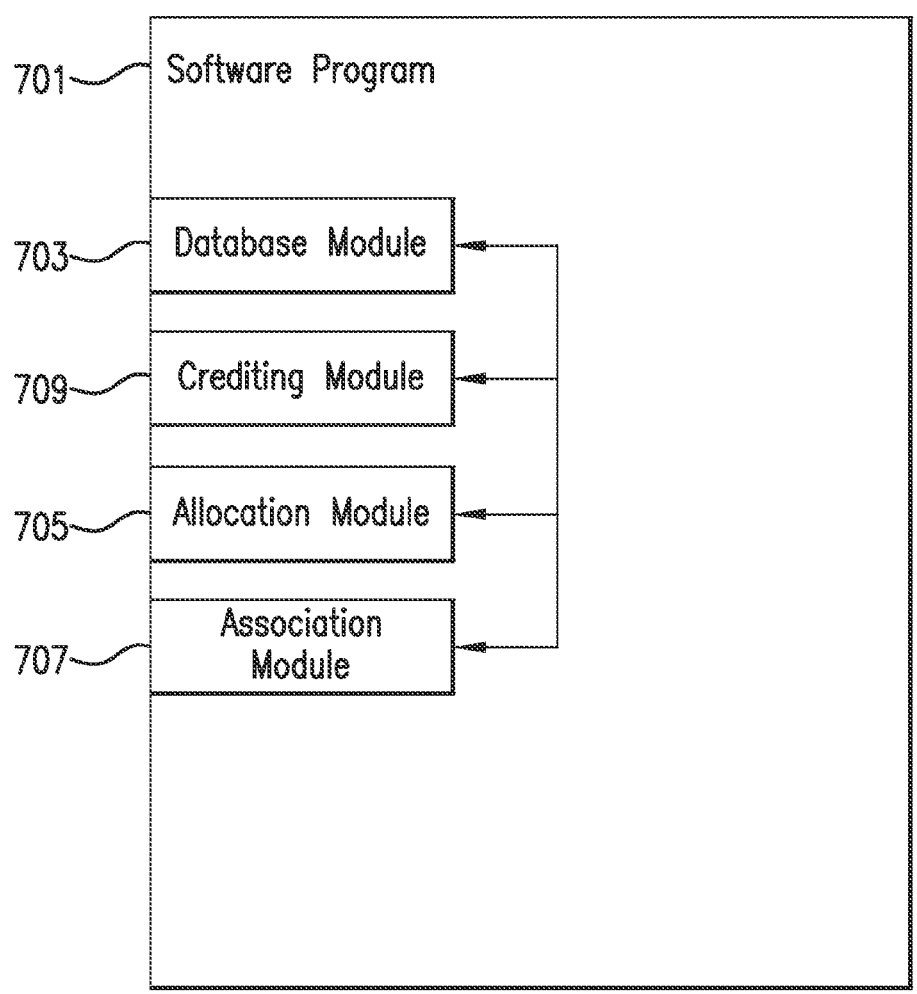
FIG. 7 shows a block diagram of a software program according to another embodiment of the present invention.

Referring now to FIG. 7, a block diagram of a software program according to another embodiment of the present invention is shown. As seen in this Fig., Software Program 701 includes:

1) Database Module 703 for storing data concerning each credit, each senior holder, each subordinate holder, each senior holder financial instrument, each subordinate holder financial instrument, the transaction pool, each sub-pool, and each mini-pool;

2) Allocation Module 705 for allocating sub-pools to the transaction pool, for allocating mini-pools to each of the sub-pools, and for allocating credits to each of the mini-pools, sub-pools, and transaction pool;

3) Association Module 707 for associating a senior holder and a subordinate holder with each of the credits by associating a) a senior holder with a respective senior holder financial instrument through which payments from a respective credit flow to the senior holder and b) a subordinate holder with a respective subordinate holder financial instrument through which payments from a respective credit flow to the subordinate holder; and 4) Crediting Module 709 for:
   i) crediting payments from each subordinate holder financial instrument associated with credits within the same mini-pool as a defaulting credit to perform the obligation of the senior holder financial instrument associated with the defaulting credit for the benefit of the senior holder to the extent that payments due the senior holder associated with the defaulting credit are not available;
   ii) crediting payments from each subordinate holder financial instrument associated with credits outside the mini-pool with the defaulting credit but within the same sub-pool as the defaulting credit to perform the obligation of the senior holder financial instrument associated with the defaulting credit for the benefit of the senior holder to the extent that the payments of each subordinate holder financial instrument associated with credits within the same mini-pool as the defaulting credit which were used for the benefit of the senior holder do not cover the obligation of the defaulting credit;
   iii) crediting payments from each subordinate holder financial instrument associated with credits outside the sub-pool containing the defaulting credit to perform the obligation of the senior holder financial instrument associated with the defaulting credit for the benefit of the senior holder to the extent that the payments of each subordinate holder financial instrument associated with credits within the same sub-pool as the defaulting credit which were used for the benefit of the senior holder do not cover the obligation of the defaulting credit;
   iv) crediting each subordinate holder associated with credits outside the sub-pool containing the defaulting credit with the benefit of the obligation of the defaulting credit to the associated senior holder to the extent that the payments due each subordinate holder associated with credits outside the sub-pool containing the defaulting credit were used to perform the obligation of the defaulting credit;
   v) crediting each subordinate holder associated with credits within the same sub-pool as the defaulting credit with the benefit of the obligation of the defaulting credit to the associated senior holder to the extent that payments due each subordinate holder associated with credits within the same sub-pool as the defaulting credit were used to perform the obligation of the defaulting credit and to the extent that a benefit exists after any benefit is provided each subordinate holder associated with credits outside the sub-pool containing the defaulting credit; and
   vi) crediting each subordinate holder associated with credits within the same mini-pool as the defaulting credit with the benefit of the obligation of the defaulting credit to the associated senior holder to the extent that payments due each subordinate holder associated with credits within the same mini-pool as the defaulting credit were used to perform the obligation of the defaulting credit and to the extent that a benefit exists a) after any benefit is provided each subordinate holder associated with credits outside the sub-pool containing the defaulting credit and b) after any benefit is provided each subordinate holder associated with credits outside the mini-pool containing the defaulting credit and within the sub-pool containing the defaulting credit.

Figure 8:
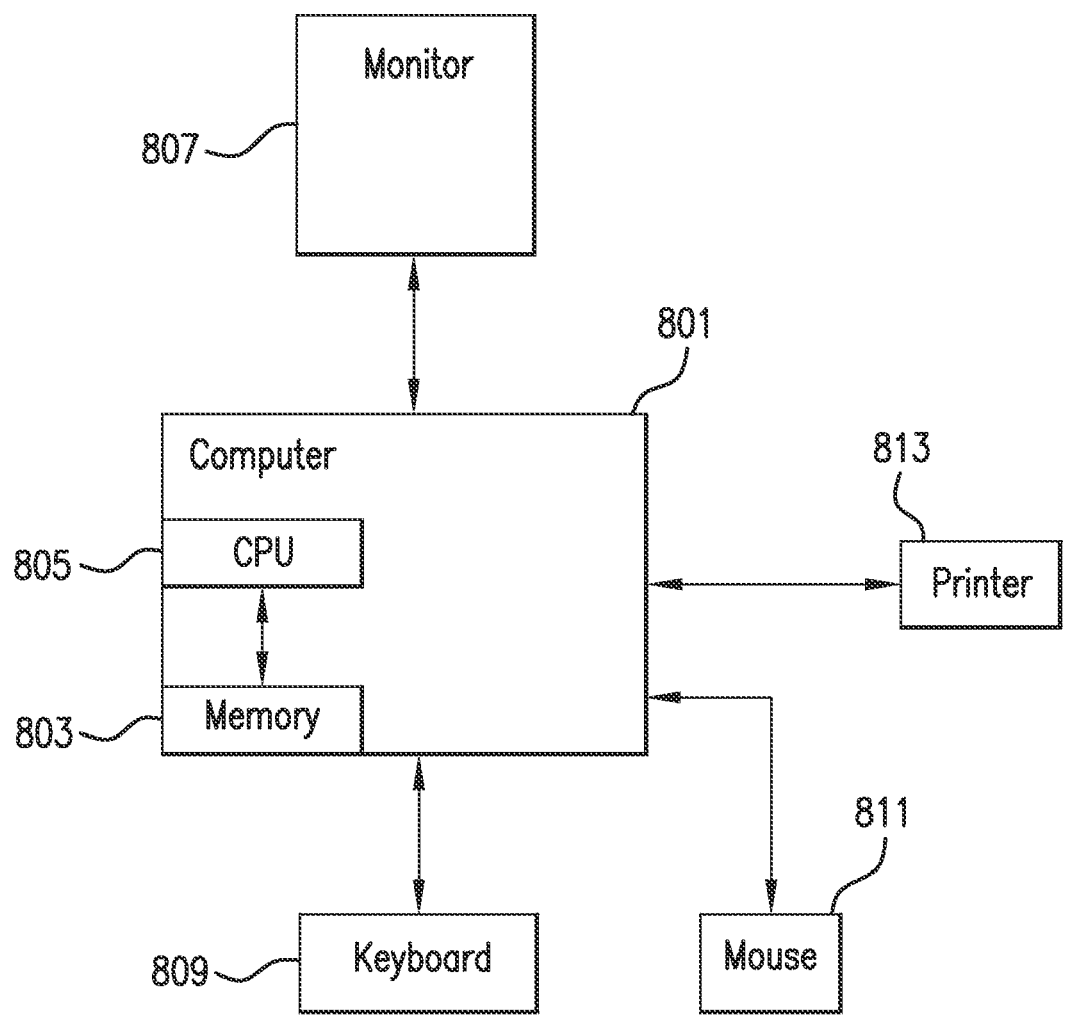
FIG. 8 shows a block diagram of a system according to another embodiment of the present invention.

Referring now to FIG. 8, a block diagram of a system according to another embodiment of the present invention is shown. As seen in this Fig., Computer 801 includes Memory 803 for storing a software program (not shown) and CPU 805 for processing the software program. Monitor 807, Keyboard 809, Mouse 811, and Printer 813 are connected to Computer 801 to provide user input/output. The software program stored in Memory 803 and processed by CPU 805 may of course be the software program of the present invention. In any case, the details of each of Computer 801, Memory 803, CPU 805, Monitor 807, Keyboard 809, Mouse 811, and Printer 813 are well known to those of ordinary skill in the art and will not be discussed further.

Figure 9:
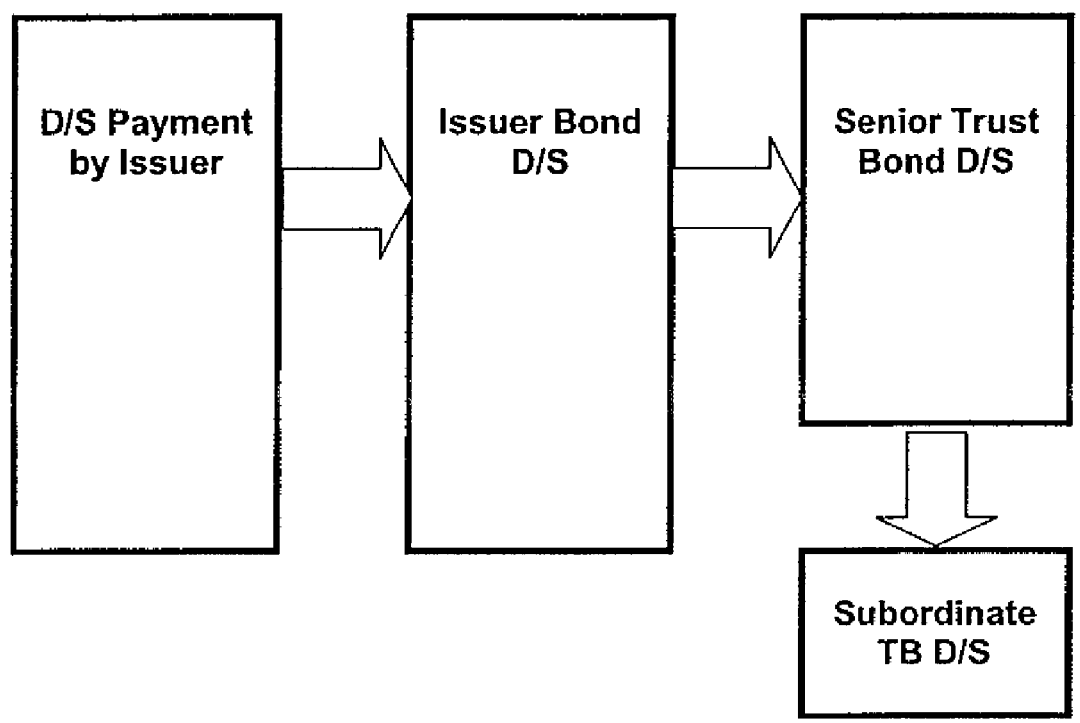
FIG. 9 shows a block diagram of a flow of funds according to another embodiment of the present invention.

Referring now to yet another embodiment of the present invention, credit tranches may be created by having an issuer's bonds (hereinafter "Issuer Bonds" or "IBs") deposited in a trust which in turn issues various classes of securities (hereinafter "Trust Bonds" or "TBs"). Such Trust Bonds may be related to the Issuer Bonds and may be issued to the public and/or to any other appropriate group. It is believed that this approach may work to permit credit tranching for securities, such as General Obligations, for which the issuer may not have authority to create tranches directly. In the event of a payment of less than all of the amount due on the Issuer Bond(s), the entire amount received on the Issuer Bond(s) would go first to secure payment of debt service on the related senior Trust Bond(s) with any balance going to pay the debt service on the subordinate Trust Bond(s). FIG. 9 shows a diagram of such a flow of finds (debt service is abbreviated as "D/S" in this Figure).

In one example of the present embodiment the terms of the Trust Bonds, such as, for example, amount, payment dates, and redemption provisions, but excluding interest rates, would substantially mirror the provisions of the related Issuer Bond(s).

For any Issuer Bond(s) for which there is express provision for the application of available monies to pay debt service in the event of a shortfall, in one example, this approach may create high grade credit tranches and/or credit tranches with high coverage.

It is noted that outside of the housing sector, senior bonds are traditionally assigned only a slightly higher rating than the subordinate bonds. This suggests that either: i) there is still a perceived risk that notwithstanding the provisions for apportionment of monies in the event of a shortfall, no payment will be made; or ii) the portion of an issue that could be assigned a high grade rating using the traditional senior/subordinate approach is significantly smaller generally than is the case in housing. A possible explanation is that the percentage change in the revenues of the issuer necessary to result in a non-payment of the senior bonds is not sufficiently different from that necessary to cause a non-payment of the subordinate bonds to provide a materially higher level of protection. However, for issuers with a heavy debt burden, it is believed that the difference should be material.

With respect to the risk of non-payment, in the case of Issuer Bonds according to the present invention which are secured by a net revenue pledge, the other creditors are provided for prior to the payment of any debt service. So, given an explicit provision on the allocation of funds in the event of an insufficiency, the risk of non-payment should be insignificant. Consequently, a gross pledge of revenues may present a greater risk that there could be a period of non-payment while a court determines how much gets applied to the cost of operations. Even so, the risk to the senior Trust Bonds would predominantly be with respect to the timing of payment rather than with respect to payment itself.

In this regard, one method of reducing the timing risk to the senior TBs would be to fund a reserve for them as soon as a payment default occurred on the IBs and prior to the payment of debt service on the subordinate TBs. This process would effectively result in application of the entire reserve (hereinafter "debt service reserve fund", or "DSRF") to secure the senior TBs and, for a typical situation, provide protection with respect to timeliness of payment for a period of, for example, 1.5 to 2 years (depending on the proportion of senior TBs). Of note is the fact that there may be tax issues with respect to the use of the reserve in this manner. Also, the aforementioned approach of funding a reserve would increase the probability of an actual non-payment with respect to the subordinate TBs (since they would not get any benefit from the DSRF).

If no special reserve is created for the senior TBs, then there is substantially no difference in the probability of a non-payment event between the Issuer Bonds and the Trust Bonds. However, in the event of a non-payment event, the severity of the non-payment event is more severe for the subordinate TBs than for the IBs, and less severe for the senior TBs.

Figure 10:
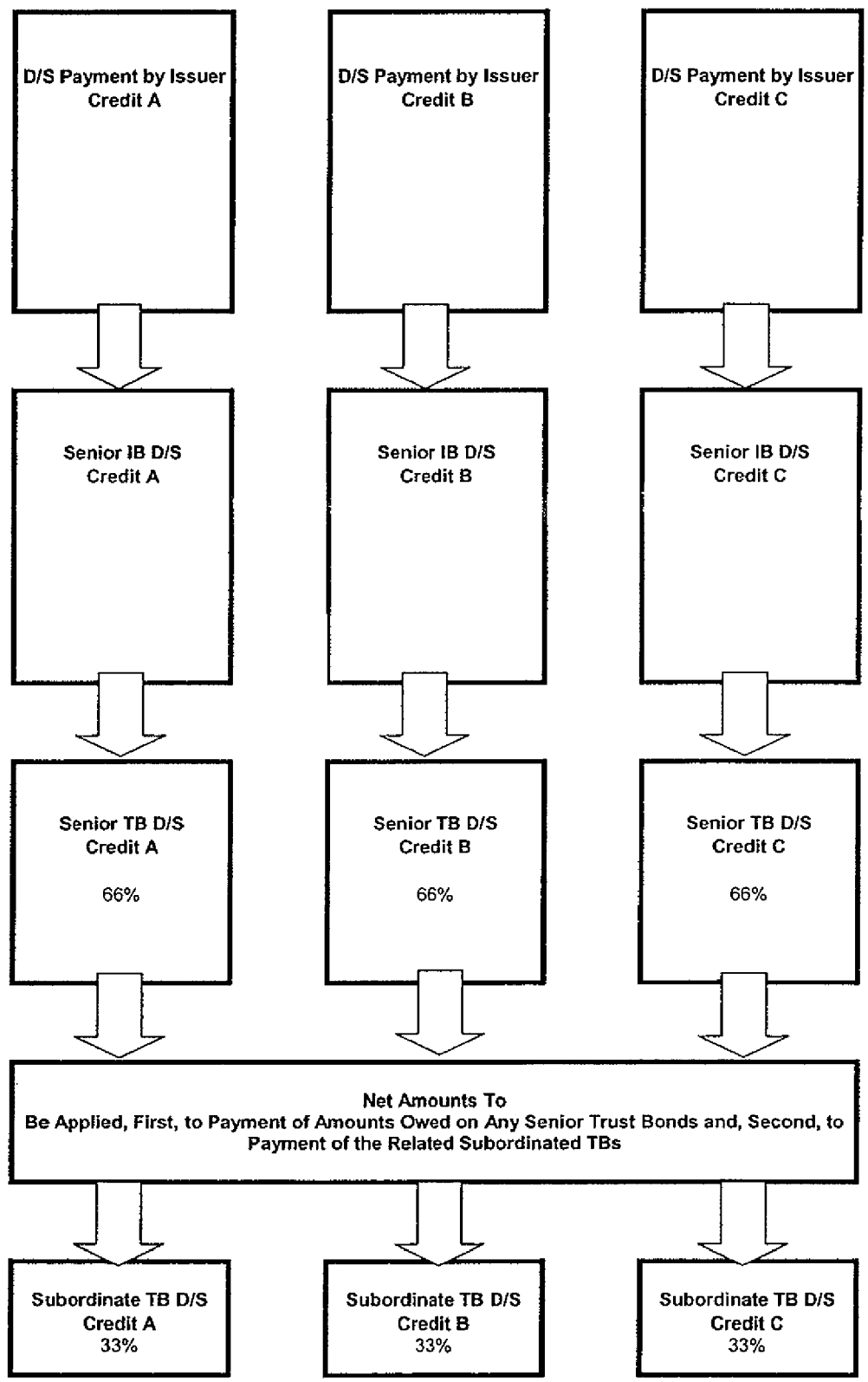
FIG. 10 shows a block diagram of a method according to another embodiment of the present invention.

Referring now to yet another embodiment of the present invention, an approach which addresses concerns regarding the timeliness of payment of senior TBs may be accomplished as follows: pool together two or more Issuer Bond credits such that amounts available after payment of the senior TBs for each credit are used to secure the payment of the other senior TBs in the event that the amounts received for payment of the related Issuer Bonds are not sufficient to pay the senior TBs. In other words, payments allocable to each series of subordinate TBs are applied first, to the extent needed, to pay unpaid amounts on any of the senior TBs. FIG. 10 shows a diagram of the credit structure of such an approach (debt service is abbreviated as "D/S" in this Figure).

In one example, the following discussion of the aforementioned pooling approach assumes that substantially equal amounts of bonds are issued for each credit, that the bonds are issued substantially simultaneously, and that the bonds are payable on substantially the same dates.

In any case, it is noted that if the ratio of senior to subordinate TBs is 2-to-1 (i.e., 66% senior TBs), then the senior TBs of each credit are fully secured by the sum of the amounts allocable to the subordinate tranches for the other two credits. However, the ratio of total senior obligations to the total amounts securing them is 1 to 1.33.

Further, if the ratio of senior to subordinate TBs is 1-to-1 (i.e., 50% senior TBs), the senior TBs of each credit are over-collateralized 2× by the sum of the amounts allocable to the subordinate tranches for the other two credits. Also, the ratio of total senior obligations to the total amounts securing them is 1 to 2.

Applying the principles typically applicable to two-party-pay situations, the senior TBs should be rated from A to triple-A, depending on such criteria as the percentage of senior debt, the strength of the underlying credits, and the degree of correlation between the underlying credits. Each of the senior TB tranches would have both: i) an underlying rating determined on the basis of the tranching of the individual credit; and ii) an enhanced rating based on the impact of pooling.

On the other hand, each of the subordinate TBs could be rated as low as the weakest rating (without regard to pooling) of any of the senior TB tranches. The credit impact of the proposed structure on the subordinate TBs could be mitigated by: i) first applying amounts related to the same underlying credit; and ii) then applying amounts securing the weakest of the other underlying credits (thereby reducing the possibility that the subordinate TBs related to the stronger underlying credit would be affected).

In one example, if the senior tranches can achieve at least double-A category ratings, it is believed that the savings from this structure could accrue both from lower interest rates on the senior bonds as well as from the avoided cost of bond insurance on the senior bonds. Those savings would be reduced in part by any increase in yield necessary to market the subordinate TBs and by any increase in the costs of bond insurance. However, the net benefit could be used to reduce the issuer's cost of funds.

Further, it is noted with regard to the present example that if the underlying ratings of all three credits are the same, the subordinate TBs would arguably have the same ratings as the Issuer Bonds while the senior TBs should receive significantly higher ratings. As mentioned earlier, the probability of a non-payment event would be substantially the same for both the Issuer Bonds and the subordinate TBs. However, if such an event did occur, the severity of the event could be greater for the subordinate TBs. (This runs counter to the idea that the issuer would not make any payment in the event of a shortfall).

Another example of a pooled Trust Bond embodiment of the present invention will now be described with reference to the credit tranching and pooling of three New York City credits. More particularly, the discussion will be a simplified analysis of the credit tranching and pooling of the General Obligation credit ("NYCGO"), the Municipal Water Finance Authority ("NYCWFA"), and the Transitional Finance Authority ("NYCTEA").

In one example, the analysis assumes that the MOODYS, STANDARD & POORS, and FITCH ratings of the bonds secured by the credits are as shown in Table 1:

TABLE 1

|  | NYCWFA | NYCGO | NYCTFA |
| --- | --- | --- | --- |
| MOODYS | A1 | A3 | Aa3 |
| STANDARD & POORS | A | A- | AA |
| FITCH | AA- | A- | AA+ |

Moreover, the analysis assumes that the pool includes two-thirds senior and one-third subordinate TBs. Therefore, as long as not more than one credit defaults at any time, the defaulting senior Trust Bonds will be fully secured by amounts allocable to the subordinate TBs of the other two credits. Also, the credit tranching within each credit provides protection except during any period in which the issuer is making no payments on that credit. In essence, the only time that there could be a problem with payment of the senior TBs in this example would be in the situation where the City was simultaneously making no payments on two of the three credits.

Accordingly, it is believed that even though the TBs are not fully covered by the obligations of two parties, given: i) the low correlation among the three credits (other than with respect to general economic conditions); and ii) the fact that the diversification of the credits and credit tranching would allow the structure to accommodate significant simultaneous payment shortfalls (up to 50%) with respect to two credits without a non-payment of senior TBs, application of the two-party pay criteria in assessing the impact of the structure on the ratings of the senior Trust Bonds should be appropriate.

Note that for each senior TB to be fully secured by two credits, the senior TBs could not exceed 50% of each series. Given the ratings of the three NYC credits, a literal application of the two-party pay criteria would result in triple-A ratings on two-thirds of the senior Trust Bonds and double-A ratings on the remaining third. As in the case of the 66% senior TBs, the structure cannot withstand total non-payment of two of the credits at the same time. With 50% senior bonds, the structure could withstand a simultaneous 75% payment shortfall by two of the credits. However, this would result in a structure having a larger amount of subordinate TBs. Minimizing the amount of subordinate TBs is important (unless the underlying credits all have the same or very similar ratings) since the rating of the subordinate TBs may be the lowest common denominator of the three credits. Minimizing the amount of subordinate TBs also spreads the benefit of the higher ratings on the senior tranche across a larger amount of bonds.

Figure 11:
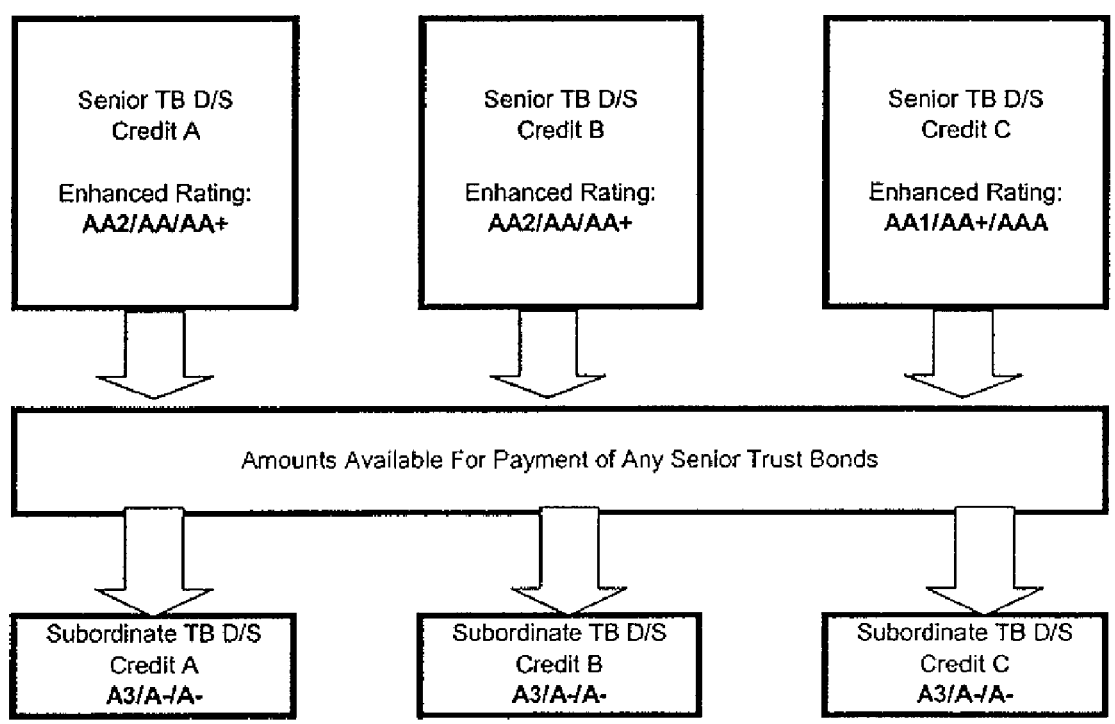
FIG. 11 shows a block diagram of a method according to another embodiment of the present invention.

Applying, for example, MOODY's two-party pay criteria to the scenario with two-thirds senior bonds results in the senior TB ratings indicated in FIG. 11 (debt service is abbreviated as "D/S" in this Figure). The two-party pay criteria were applied assuming a medium correlation among the credits. Further, for each senior TB series, the two-party pay criteria were applied using the related underlying credit together with the weakest of the other two credits.

Interestingly, given the Trust Bond ratings in this example, the City would be selling substantially the same amount of A3/A-/A- Trust Bonds as it would have been selling NYC-GO's with the same rating. However, it is believed that the ratings on all of the other bonds would be enhanced. Possibly these "natural" double-A Trust-Bonds could trade flat to or through insured bonds. The benefit of the bond issue to the City would be the sum of: i) avoided cost of bond insurance on the senior TBs; plus ii) the interest savings attributable to the credit spread between the ratings on the senior TBs and the underlying ratings on any related Issuer Bonds; minus iii) any increase in the interest cost or cost of bond insurance for the subordinate TBs as compared with what such costs would have been for the underlying bonds.

Moreover, by separately applying the two-party pay criteria to the portion of each series of senior TBs that is secured by each of the other series, it should be possible to assign an even higher rating to at least half of the senior TBs.

It is noted that the examples discussed above do not take into account a variety of issues, including: i) relative size of issuance among the different credits; ii) different timing of issuance among the different credits; iii) intra-period timing issues with respect to debt service payments on the different categories of Issuer Bonds; iv) differences in the shape of debt service among the different credits; v) disclosure issues raised by the structure (e.g., disclosure on all three credits could be material to every series of both senior and subordinate bonds); vi) tax issues; and vii) legal authority of the Issuer to implement the structure.

Another example of a slightly different application of the present invention would be for New York City to: i) have a single class of TB tranches for each of the GO, WFA and TFA credits; and ii) have the amounts allocable to the GO and WFA TBs secure payment of TBs issued for the TFA. Since the TFA is rated higher, the exposure to the TFA credit should not hurt the ratings of the GO and WFA TBs. However, the TFA TBs should be rated triple-A.

Referring now to another example of a pooled Trust Bond embodiment of the present invention, a credit structure combines the revenues from two or more systems as part of a single security package. More particularly, a trust could hold senior lien obligations from the two or more systems. In one example, the trust may be single purpose trust. The trust could have the authority to issue securities against those securities held in the trust. Each system could be legally responsible for their respective obligations to the trust. The trust, in turn, could issue securities to the public in a senior/subordinate structure. The revenue stream flowing out of the trust from the obligations of the two or more systems (e.g. a water system and a sewer system), which could mirror the principal and interest on the publicly held debt, could provide bondholder security. The senior/subordinate structure could allow the trust to tranche the securities with differing coverage ratios. Such tranched securities could allow for the senior lien obligations to be rated higher than the underlying obligations on their own.

A more specific example of the aforementioned embodiment of the present invention could work is as follows: A water system and a sewer system could each issue bonds in the total amount of $200 million to the trust (i.e., $100 million each). The trust could then issue bonds to the public consisting of $100 million senior lien bond(s) and $100 million junior lien bond(s). Bondholders in general would benefit because the revenues used to pay debt service would be coming from both the water and sewer systems. In addition, the senior lien bondholders would benefit because their bonds would have coverage of 2.0× (at least $200 million in revenues to pay $100 million in senior lien obligations). If there were to be a default by either the water or sewer system to the trust, the senior lien bondholders would be secured because the non-defaulting system's revenues would cover the senior lien obligations. It is believed that in one example a structure like this would allow the senior lien bond(s) to achieve a rating of at least Aa2/AA (by STANDARD & POORS, for example), while the junior lien bonds would receive ratings at the lower of the water or sewer system ratings.

While a number of embodiments of the present invention have been described, it is understood that these embodiments are illustrative only, and not restrictive, and that many modifications may become apparent to those of ordinary skill in the art. For example, while the present invention has been described with reference to each credit being associated with a single senior holder financial instrument and a single subordinate holder financial instrument any desired number of tiered seniority senior holder financial instruments and/or tiered seniority subordinate holder financial instruments could be used. Further still, while the present invention has been described with reference to each senior holder financial instrument and each subordinate holder financial instrument being associated with a single respective senior holder and a single respective subordinate holder any desired number of senior holders and/or subordinate holders could be associated with each respective senior holder financial instrument and subordinate holder financial instrument. Further still, each TSB holder (i.e., each senior holder or each subordinate holder) could directly own the respective underlying credit or have a pass-through interest in the form of ownership of an interest in a mutual fund, trust, partnership, or corporation (either debt or equity). Further still, the obligation of subordinate holders to cover for senior holders could be in the form a guarantee, an insurance policy, or an agreement to purchase (either all payments or defaulted payments) Further still, each credit and associated senior holder financial instrument and/or subordinate holder financial instrument could be incorporated into a single instrument. Further still, the present invention may be implemented with or without the cooperation of a credit issuer. Further still, the pooled credits could be from related issuers and/or from separate issuers. Further still, the pool may have a relatively large number of credits (a larger pool should allow for smaller subordinate TB tranches.) Further still, even for a large pool of general infrastructure type credits (excluding bonds such as appropriation bonds, with significant event risk), it should be valid to assume that not more than two or three credits would ever be in a non-payment mode at the same time. Further still, the memory of the system may comprise a magnetic hard drive, a magnetic floppy disk, a compact disk, a ROM, a RAM, and/or any other appropriate memory. Further still, the computer of the system may comprise a stand-alone PC-type micro-computer as depicted or the computer may comprise one of a mainframe computer or a mini-computer, for example. Further still, another computer could access the software program being processed by the CPU by utilizing a local area network, a wide area network, or the Internet, for example.

What is claimed is:

1. A method implemented by a computer system for structuring a financial transaction, comprising:

allocating, with the computer system, to a transaction pool a first credit having an obligation to make specified payments and a second credit having an obligation to make specified payments, each of the first credit and second credit being in a non-default state when a respective obligation is met and being in a default state when a respective obligation is not met;

associating, with the computer system, a first senior holder and a first subordinate holder with the first credit using a) a respective first senior holder financial instrument through which payments from the first credit flow to the first senior holder and b) a respective first subordinate holder financial instrument through which payments from the first credit flow to the first subordinate holder;

associating, with the computer system, a second senior holder and a second subordinate holder with the second credit using a) a respective second senior holder financial instrument through which payments from the second credit flow to the second senior holder and b) a respective second subordinate holder financial instrument through which payments from the second credit flow to the second subordinate holder;

structuring the first senior holder financial instrument and the first subordinate holder financial instrument to give priority to payments due the first senior holder prior to payments due the first subordinate holder in the event the first credit enters the default state;

using payments from the second subordinate holder financial instrument to perform the obligation of the first credit for the benefit of the first senior holder to the extent that the first credit enters the default state and payments due the first senior holder are not available; and providing the second subordinate holder the benefit of the obligation of the first credit to the extent that payments due the second subordinate holder were used to perform the obligation of the first credit;

wherein both the first subordinate holder and the second subordinate holder are junior to the first senior holder but neither of the first senior holder nor the second senior holder are junior to one another; and wherein the amount of the first credit is limited to increase the likelihood that a payment default could be fully absorbed by the payments from the second subordinate holder financial instrument.

2. The method of claim 1, further comprising:

structuring the second senior holder financial instrument and the second subordinate holder financial instrument to give priority to payments due the second senior holder prior to payments due the second subordinate holder in the event the second credit enters the default state;

using payments from the first subordinate holder financial instrument to perform the obligation of the second credit for the benefit of the second senior holder to the extent that the second credit enters the default state and payments due the second senior holder are not available; and providing the first subordinate holder the benefit of the obligation of the second credit to the extent that payments due the first subordinate holder were used to perform the obligation of the second credit.

3. The method of claim 2, wherein at least one of the first senior holder financial instrument, the second senior holder financial instrument, the first subordinate holder financial instrument, the second subordinate holder financial instrument, the first credit, and the second credit includes a bond.

4. The method of claim 3, wherein at least one of the first credit and second credit includes a credit of the type selected from a municipal credit, a tax-exempt hospital credit, an industrial credit, and a high-yield credit.

5. The method of claim 4, wherein at least one of a) the step of providing the second subordinate holder the benefit of the obligation of the first credit to the extent that payments due the second subordinate holder were used to perform the obligation of the first credit is carried out through a subrogation and b) the step of providing the first subordinate holder the benefit of the obligation of the second credit to the extent that payments due the first subordinate holder were used to perform the obligation of the second credit is carried out through a subrogation.

6. The method of claim 4, wherein at least one of a) the step of providing the second subordinate holder the benefit of the obligation of the first credit to the extent that payments due the second subordinate holder were used to perform the obligation of the first credit is carried by providing a recovery value associated with the first credit and b) the step of providing the first subordinate holder the benefit of the obligation of the second credit to the extent that payments due the first subordinate holder were used to perform the obligation of the second credit is carried out by providing a recovery value associated with the second credit.

7. The method of claim 4, wherein at least one of a) the step of providing the second subordinate holder the benefit of the obligation of the first credit to the extent that payments due the second subordinate holder were used to perform the obligation of the first credit is carried by providing a liquidation value associated with the first credit and b) the step of providing the first subordinate holder the benefit of the obligation of the second credit to the extent that payments due the first subordinate holder were used to perform the obligation of the second credit is carried out by providing a liquidation value associated with the second credit.

8. A method implemented by a computer system for structuring a financial transaction, comprising:
    allocating, with the computer system, to a transaction pool n credits, each of the credits having an obligation to make specified payments and each of the credits being in a non-default state when a respective obligation is met and being in a default state when a respective obligation is not met;
    associating, with the computer system, a senior holder and a subordinate holder with each of the credits using a) a respective senior holder financial instrument through which payments from a respective credit flow to the senior holder and b) a respective subordinate holder financial instrument through which payments from a respective credit flow to the subordinate holder;
    structuring each senior holder financial instrument and each subordinate holder financial instrument to give priority to payments due each respective senior holder prior to payments due each respective subordinate holder in the event a respective credit enters the default state;
    using payments from at least one subordinate holder financial instrument associated with a credit in the non-default state to perform the obligation of a credit in the default state to the extent that payments due the senior holder associated with the credit in the default state are not available; and
    providing each subordinate holder at least a portion of the benefit of the obligation of the credit in the default state to the extent that payments due each subordinate holder were used to perform the obligation of the credit in the default state;
    wherein n is an integer in the range of 2 to 1000;
    wherein each subordinate holder is junior to each senior holder but none of the senior holders is junior to one another; and
    wherein the amount of at least a first one of the credits is limited to increase the likelihood that a payment default could be fully absorbed by the payments from at least one subordinate holder financial instrument associated with a credit in the non-default state.

9. A method implemented by a computer system for structuring a financial transaction, comprising:
    allocating, with the computer system, to a transaction pool a first sub-pool containing a first credit having an obligation to make specified payments and a second credit having an obligation to make specified payments, each of the first credit and second credit being in a non-default state when a respective obligation is met and being in a default state when a respective obligation is not met;
    allocating, with the computer system, to the transaction pool a second sub-pool containing a third credit having an obligation to make specified payments and a fourth credit having an obligation to make specified payments, each of the third credit and fourth credit being in a non-default state when a respective obligation is met and being in a default state when a respective obligation is not met;
    associating, with the computer system, a first senior holder and a first subordinate holder with the first credit using a) a respective first senior holder financial instrument through which payments from the first credit flow to the first senior holder and b) a respective first subordinate holder financial instrument through which payments from the first credit flow to the first subordinate holder;
    associating, with the computer system, a second senior holder and a second subordinate holder with the second credit using a) a respective second senior holder financial instrument through which payments from the second credit flow to the second senior holder and b) a respective second subordinate holder financial instrument through which payments from the second credit flow to the second subordinate holder;
    associating, with the computer system, a third senior holder and a third subordinate holder with the third credit using a) a respective third senior holder financial instrument through which payments from the third credit flow to the third senior holder and b) a respective third subordinate holder financial instrument through which payments from the third credit flow to the third subordinate holder;
    associating, with the computer system, a fourth senior holder and a fourth subordinate holder with the fourth credit using a) a respective fourth senior holder financial instrument through which payments from the fourth credit flow to the fourth senior holder and b) a respective fourth subordinate holder financial instrument through which payments from the fourth credit flow to the fourth subordinate holder;
    structuring the first senior holder financial instrument and the first subordinate holder financial instrument to give priority to payments due the first senior holder prior to payments due the first subordinate holder in the event the first credit enters the default state;
    structuring the second senior holder financial instrument and the second subordinate holder financial instrument to give priority to payments due the second senior holder prior to payments due the second subordinate holder in the event the second credit enters the default state;
    structuring the third senior holder financial instrument and the third subordinate holder financial instrument to give priority to payments due the third senior holder prior to payments due the third subordinate holder in the event the third credit enters the default state;
    structuring the fourth senior holder financial instrument and the fourth subordinate holder financial instrument to give priority to payments due the fourth senior holder prior to payments due the fourth subordinate holder in the event the fourth credit enters the default state;
    using payments from the second subordinate holder financial instrument to perform the obligation of the first credit for the benefit of the first senior holder to the extent that the first credit enters the default state and payments due the first senior holder are not available;

using payments from at least one of the third subordinate holder financial instrument and the fourth subordinate holder financial instrument to perform the obligation of the first credit for the benefit of the first senior holder to the extent that the payments of the second subordinate holder financial instrument used for the benefit of the first senior holder do not cover the obligation of the first credit;

providing each of the third subordinate holder and the fourth subordinate holder the benefit of the obligation of the first credit to the first senior holder to the extent that the payments of the third subordinate holder financial instrument and the fourth subordinate holder financial instrument are used for the benefit of the first senior holder; and providing the second subordinate holder the benefit of the obligation of the first credit to the first senior holder to the extent that payments of the second subordinate holder financial instrument were used to perform the obligation of the first credit and to the extent that a benefit exists after any benefit is provided the third subordinate holder and the fourth subordinate holder;

wherein both the first subordinate holder and the second subordinate holder are junior to the first senior holder but neither of the first senior holder nor the second senior holder are junior to one another; and wherein the amount of the first credit is limited to increase the likelihood that a payment default could be fully absorbed by the payments from the second subordinate holder financial instrument and from at least one of the third subordinate holder financial instrument and the fourth subordinate holder financial instrument.

10. The method of claim 9, wherein all credits allocated to a particular sub-pool have a substantially similar risk of entering the default state.

11. The method of claim 10, wherein all credits allocated to a particular sub-pool are selected from one of a traditional municipal credit, a tax-exempt hospital credit, an industrial corporate credit, and a high-yield credit.

12. A method implemented by a computer system for structuring risk in a financial transaction, comprising:

structuring a transaction pool with n sub-pools;

allocating, with the computer system, to each of the sub-pools between j and k credits, each credit having an obligation to make specified payments and each credit being in a non-default state when a respective obligation is met and being in a default state when a respective obligation is not met;

associating, with the computer system, a senior holder and a subordinate holder with each of the credits using a) a respective senior holder financial instrument through which payments from the credit flow to the senior holder and b) a respective subordinate holder financial instrument through which payments from the credit flow to the subordinate holder; structuring each senior holder financial instrument and each subordinate holder financial instrument to give priority to payments due the respective senior holder prior to payments due the respective subordinate holder in the event the associated credit enters the default state;

using payments from each subordinate holder financial instrument associated with credits within the same sub-pool as a defaulting credit to perform the obligation of the defaulting credit for the benefit of the associated senior holder to the extent that payments due the senior holder associated with the defaulting credit are not available;

using payments from each subordinate holder financial instrument associated with credits outside the sub-pool containing the defaulting credit to perform the obligation of the defaulting credit for the benefit of the associated senior holder to the extent that the payments of each subordinate holder financial instrument associated with credits within the same the sub-pool as the defaulting credit which were used for the benefit of the senior holder do not cover the obligation of the first credit;

providing each subordinate holder associated with credits outside the sub-pool containing the defaulting credit the benefit of the obligation of the defaulting credit to the associated senior holder to the extent that the payments due each subordinate holder associated with credits outside the sub-pool containing the defaulting credit were used to perform the obligation of the defaulting credit; and providing each subordinate holder associated with credits within the same sub-pool as the defaulting credit the benefit of the obligation of the defaulting credit to the associated senior holder to the extent that payments due each subordinate holder associated with credits within the same sub-pool as the defaulting credit were used to perform the obligation of the defaulting credit and to the extent that a benefit exists after any benefit is provided each subordinate holder associated with credits outside the sub-pool containing the defaulting credit;

wherein n is an integer in the range of 2 to 1000;

wherein j and k are integers in the range of 1 to 1000; and wherein each subordinate holder is junior to each senior holder but none of the senior holders is junior to one another; and wherein the amount of at least a first one of the credits is limited to increase the likelihood that a payment default could be fully absorbed by the payments from each subordinate holder financial instrument associated with credits within the same sub-pool as the defaulting credit and from each subordinate holder financial instrument associated with credits outside the sub-pool containing the defaulting credit.

13. A method implemented by a computer system for structuring risk in a financial transaction, comprising:

allocating, with the computer system, to a trust a first issuer credit having an obligation to make specified payments and a second issuer credit having an obligation to make specified payments, each of the first issuer credit and second issuer credit being in a non-default state when a respective obligation is met and being in a default state when a respective obligation is not met;

associating, with the computer system, a first senior holder and a first subordinate holder with the first issuer credit using a) a respective first senior holder trust instrument through which payments from the first issuer credit flow to the first senior holder and b) a respective first subordinate holder trust instrument through which payments from the first issuer credit flow to the first subordinate holder;

associating, with the computer system, a second senior holder and a second subordinate holder with the second issuer credit using a) a respective second senior holder trust instrument through which payments from the second issuer credit flow to the second senior holder and b) a respective second subordinate holder trust instrument through which payments from the second issuer credit flow to the second subordinate holder;

structuring the first senior holder trust instrument and the first subordinate holder trust instrument to give priority to payments due the first senior holder prior to payments due the first subordinate holder in the event the first issuer credit enters the default state;

using payments from the second subordinate holder trust instrument to perform the obligation of the first issuer credit for the benefit of the first senior holder to the extent that the first issuer credit enters the default state and payments due the first senior holder are not available; and providing the second subordinate holder the benefit of the obligation of the first issuer credit to the extent that payments due the second subordinate holder were used to perform the obligation of the first issuer credit;

wherein both the first subordinate holder and the second subordinate holder are junior to the first senior holder but neither of the first senior holder nor the second senior holder are junior to one another; and wherein the amount of the first issuer credit is limited to increase the likelihood that a payment default could be fully absorbed by the payments from the second subordinate holder trust instrument.

* * * * *